(12) United States Patent
Noma et al.

(10) Patent No.: US 6,983,231 B2
(45) Date of Patent: Jan. 3, 2006

(54) INFORMATION PROCESSING DEVICE AND METHOD, DATA HOLDING DEVICE, AND PROGRAM

(75) Inventors: Hideki Noma, Kanagawa (JP); Masahiro Fujita, Saitama (JP); Makoto Inoue, Kanagawa (JP); Noritoshi Inoue, Tokyo (JP); Katsuya Muramatsu, Kanagawa (JP); Masashi Takeda, Tokyo (JP)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 09/958,244

(22) PCT Filed: Feb. 9, 2001

(86) PCT No.: PCT/JP01/00948
§ 371 (c)(1),
(2), (4) Date: Oct. 5, 2001

(87) PCT Pub. No.: WO01/59703
PCT Pub. Date: Aug. 16, 2001

(65) Prior Publication Data
US 2003/0074107 A1 Apr. 17, 2003

(30) Foreign Application Priority Data
Feb. 9, 2000 (JP) .................................... 2000-038096
Feb. 10, 2000 (JP) .................................... 2000-038256

(51) Int. Cl.
*G06G 7/48* (2006.01)

(52) U.S. Cl. .......................................... 703/6; 345/473

(58) Field of Classification Search .............. 703/6, 703/11; 700/86; 345/473

See application file for complete search history.

(56) References Cited

U.S. PATENT DOCUMENTS

| | | | | |
|---|---|---|---|---|
| 5,966,526 A | * | 10/1999 | Yokoi | 703/11 |
| 6,449,518 B1 | * | 9/2002 | Yokoo et al. | 700/86 |
| 6,604,091 B2 | * | 8/2003 | Sadakuni | 706/14 |
| 6,609,147 B1 | * | 8/2003 | Matsuda et al. | 709/205 |

FOREIGN PATENT DOCUMENTS

| | | |
|---|---|---|
| EP | 0 898 237 A2 | 2/1999 |
| JP | 11-76622 | 3/1999 |
| JP | 11-126017 | 5/1999 |

OTHER PUBLICATIONS

Play Station, pp. 152–155, dated Feb. 26, 1999.
Play Station, pp. 108–109, dated Apr. 9, 1999.

* cited by examiner

*Primary Examiner*—Albert W. Paladini
(74) *Attorney, Agent, or Firm*—Frommer Lawrence & Haug LLP; William S. Frommer

(57) ABSTRACT

In an information processing device and method, and programs, firstly, new second inheritance data is created based on first inheritance data regulating the shape and/or behaviors of a virtual creature and secondly, the gene data of the virtual creature is diagnosed and a given value added is applied to the virtual creature when it is determined based on the diagnostic result that the gene data satisfies predetermined conditions and thirdly, information on parents of virtual creatures which are sequentially created by mixing and registered, is stored and a pedigree of a designated virtual creature is inquired into based on the information. On the other hand, a data storing device is provided with a first storage means for storing inheritance data to regulate the shape and/or behaviors of a virtual creature, a communication means for transmitting/receiving inheritance data to/from the outside, and a second storing means for storing the inheritance data of other virtual creatures via the communication means.

31 Claims, 28 Drawing Sheets

1(120) PET ROBOT

| node 100 | INPUT EVENT NAME | DATA NAME | DATA RANGE | TRANSITION PROBABILITY TO OTHER NODES Pi | | | | node 600 |
|---|---|---|---|---|---|---|---|---|
| | | | | node 120 | node 120 | node 1000 | ~ | |
| | | | | ACTION 1 | ACTION 2 | MOVE BACK | ~ | ACTION 4 |
| TRANSITION END NODE | | | | | | | | |
| OUTPUT BEHAVIOR | | | | | | | | |
| 1 | BALL | SIZE | 0, 1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0, 100 | | | 50% | | |
| 6 | | JOY | 50, 100 | | | 100% | | |
| 7 | | SUPRISE | 50, 100 | | | | | |
| 8 | | SUDNESS | 50, 100 | | | | | |

STRUCTURE OF GENE DATA

| | |
|---|---|
| PERSONAL DATA | · SERIAL NUMBER OF PET ROBOT<br>· NAME OF PET ROBOT<br>· IMAGE OF PET ROBOT (PHOTO/MOVIE)<br>· OWNER'S NAME ET AL<br>· EXISTENCE OF PRESERVATION OF PEDIGREE<br>· NAME OF PEDIGREE<br>· MANUFACTURE DATE OF PET ROBOT<br>· DATE OF DEATH OF PET ROBOT (IF DEATH CONCEPT EXISTS) |
| PEDIGREE DATA | · PEDIGREE FILE STORING PERSONAL DATA OF PET ROBOTS ASSUMED TO BE PARENTS OF A PET ROBOT |
| SPECIFICATION DATA | · MOTION DATA<br>· SOUND DATA<br>· DATA OF OBJECTS RECOGNIZABLE<br>· CHARACTER (STATE TRANSITION TABLE, ET AL.) |

FIG. 10

GENE DATA
·PERSONAL DATA
·PEDIGREE DATA
·SPECIFICATION DATA

OWNER'S DATA
·NAME
·IMAGE (PHOTO/MOVIE/3D DATA (VRAM DATA))
·URL OF HOME PAGE
·SEX
·AGE
·OCCUPATION
·DOMICILE (COUNTRY/ADDRESS, ETC.)

MIXING HISTORY
·PAST HISTORY OF MIXING IN LINEAGE OF PET ROBOT
 (PARENTS' HISTORY)

MIXING YES/NO DATA
·MIXING YES/NO (MIXING PERMITTED, OR NOT PERMITTED)
·MIXING PRICE (WHEN MIXING FEASIBLE)

FIG. 11

DIRECT SELECTION

RETRIEVAL OF USER NAME
CAPITAL LETTER, A, KA, SA, TA, NA, HA, MA, YA, RA, WA
a, b, c, d, e·······

RETRIEVAL OF PET NAME
CAPITAL LETTER, A, KA, SA, TA, NA, HA, MA, YA, RA, WA
a, b, c, d, e·······

RETRIEVAL BY FUNCTION
FAST WALKING, STABLE WALKING, DOCILE, LAZY, MISCHIEVOUS, GOOD AT TRICKS, LONELY

RETRIEVAL BY COUNTRY
USA, ENGLAND, ITALY, FRANCE, SWITZERLAND, JAPAN, REPUBLIC OF KOREA, GERMANY, NEW ZEALAND

RETRIEVAL BY OCCUPATION
COMPANY MEMBER, FREE-TIME WORKER, DESIGNING-RELATED, COMPANY DIRECTOR, ENGINEER, SERVICE INDUSTRY, PUBLIC WORKER

INDIRECT SELECTION

QUESTION FORM
QUESTIONS ABOUT PET ROBOT, QUESTIONS ABOUT USER

RECOMMENDED SELECTION
PET OF SUPER IDOL AYUMI YAMAZAKI HERE, PETS OF KANNO SISTERS HERE

NEW ARRIVAL SELECTION
PET GOOD AT EMBODYING MOTIONS OF NOW-POPULAR SONG SADO OKESA. SUPER PET PERFORMING RECORDING WITH 8M/MIM HERE

| FRESH CREATION OF NEW DNA DATA | |
|---|---|
| PERSONAL DATA<br>·SERIAL NUMBER OF PET ROBOT<br>·NAME OF PET ROBOT<br>·IMAGE OF PET ROBOT (PHOTO/MOVIE)<br>·OWNER'S NAME, ET AL.<br>·EXISTENCE OF PRESERVATION OF PEDIGREE<br>·IF PEDIGREE EXISTS (NAME OF PEDIGREE)<br>·SEX OF PET ROBOT (IF THERE EXISTS SEX)<br>·MANUFACTURE DATE OF PET ROBOT<br>·DATE OF DEATH OF PET ROBOT<br>(IF DEATH CONCEPT EXISTS) | NEWLY ISSUED<br>REGISTERED BY USER<br>NEWLY ISSUED<br>REGISTERED BY USER<br>JUDGED FROM EXISTENCE OF PARENTS' PEDIGREE<br>PEDIGREES OF PARENTS HARMONIZED<br>NEWLY ISSUED<br>NEWLY ISSUED BASICALLY DATE OF HARMONIZATION<br>NOT REGISTERED |
| PEDIGREE DATA<br>·PEDIGREE FILE | PARENTS' PERSONAL DATA ISSUED |
| SPECIFICATION DATA<br>·MOTION DATA<br>·SOUND DATA<br>·DATA OF RECOGNIZABLE OBJECT<br>·CHARACTER (STATE TRANSITION TABLE, ET AL. | MOTION DATA PRESERVED BY PARENTS COMBINED/POLARIZED<br>SOUND DATA PRESERVED BY PARENTS INTEGRATED/POLARIZED<br>RECOGNIZABLE OBJECT DATA PRESERVED BY PARENTS INTEGRATED/POLARIZED<br>CHARACTER DATA PRESERVED BY PARENTS INTEGRATED/POLARIZED |

FIG. 14

| | | |
|---|---|---|
| PURCHASE DATA? | | |
| 81A~[YES] | [NO]~81A | |

PURCHASE DATA?
  81A~[YES]   [NO]~81A

PURCHASE PEDIGREE?
  82A~[YES]   [NO]~82B

MIXING OF BABY PERMITTED?
  83A~[YES]   [NO]~83B

DOWNLOADING BABY PROGRAM. OK?
  84A~[YES]   [NO]~84B

DOWNLOADING FINISHED

DATA OF YOUR BABY SHOWN RIGHT

BOTH PARENTS OF DESCENT STOCK, TO BE SURE.
NO DOUBT, (BABY) TO GROW TO BE A WONDERFUL
PET OF GOOD CONDUCT. BRING IT UP
WITH MUCH CARE, WILL YOU?

DELIVERY CHARGE THIS TIME: ¥500

Name         :None
Bland Type   :SilentQueen
Sex          :Male
BirthDay     :2000/3/4
Path Away Day :None

INFORMATION PROCESSING DEVICE AND METHOD, DATA HOLDING DEVICE, AND PROGRAM

TECHNICAL FIELD

The present invention relates to an information processing device and method, a data storing device and a program, and for example, is suitably applied to a network system which is to provide a gene data sale service of selling gene data of pet robots, a robot pedigree issue service of issuing pedigrees of pet robots, a emblem issue service of issuing emblems (family, mark) corresponding to pedigrees, and a pedigree inquiry service of inquiring into pedigrees.

BACKGROUND ART

Many robots and stuffed dolls have been merchandised up to now, which are capable of acting autonomously responding to inputs from outside and surrounding circumstances. Also, there are many characters which do not exist in the 3-dimensional space but which are stored as data in personal computers and portable terminal devices such as a game machine and a mobile phone and act autonomously on displays of these personal computers and portable terminal devices.

Note that, a name "virtual creature" is used for calling a character which is programmed as to exist and act, stored in a recording medium in the form of software in hardware of a personal computer, a mobile terminal device, a robot or a stuffed doll.

It would increase the fun in a virtual creature if the characteristics of a virtual creature owned by a particular user or other persons can be inherited genetically as if the characteristics of an actual creature were handed down genetically from generation to generation when such a virtual creature is purchased or its version is updated, thereby improving the entertainment in the virtual creature significantly.

In addition, It can be imagined that it would increase the fun in a virtual creature if concepts of pedigrees are introduced in such virtual creatures and such services would be provided; to issue pedigrees to the virtual creatures, to issue emblems corresponding to the pedigrees, or to examine the pedigrees, thereby improving the entertainment in the virtual creatures significantly.

DESCRIPTION OF THE INVENTION

The present invention is made in view of above points, and intends to provide an information processing device and method, a data storing device and a program, which is capable of significantly improving the entertainment in virtual creatures and robot apparatuses.

To achieve such features, an information processing device in the present invention is provided with an inheritance data creation means for newly generating second inheritance data to regulate the shape and/or behaviors of a virtual creature based on first inheritance data which regulates the shape and/or behaviors of the virtual creature. As a result, inheritance data can be created to genetically inherit the characteristics of a virtual creature owned by a user or another person as if the characteristics of an actual living thing were handed down to subsequent generations due to inheritance. Thereby, the fun in the virtual creature is improved, thus making it possible to realize an information processing device which can significantly improve entertainment in the virtual creature.

Further, according to the present invention, an information processing method is designed such that second inheritance data is newly created to regulate the shape and/or behaviors of a virtual creature based on first inheritance data which regulates the shape and/or behaviors of the virtual creature. As a result, it is possible to create inheritance data which is to genetically inherit the characteristics of the virtual creature owned by a user or another person as if the characteristics of an actual living thing were handed down to subsequent generations due to inheritance. Thereby, the fun in the virtual creature can be improved, thus making it possible to realize an information processing method which is capable of significantly improving entertainment in an virtual creature.

Further, programs according to the present invention make a computer execute processing including a first step of newly creating second inheritance data to regulate the shape and/or behaviors of a virtual creature, which exists as data and is programmed to act, based on first inheritance data which regulates the shape and/or behaviors of the virtual creature.

Furthermore, the present invention provides a data storing device with a first memory means for storing inheritance data which regulates the shape and/or behaviors of a virtual creature, a communication means for transmitting/receiving inheritance data to/from the outside, and a second memory means for storing the inheritance data of other virtual creatures obtained by the communication means. Thereby, using the aforementioned information processing device and method according to the present invention makes it possible to newly create inheritance data based on inheritance data of own virtual creature stored in the data storing device and inheritance data of another virtual creature stored by another data storing device. As a result, it is possible to create inheritance data which is to genetically inherit the characteristics of the virtual creature owned by a user or another person as if the characteristics of an actual living thing were handed down to subsequent generations due to inheritance. Thereby, the fun in the virtual creature can be improved, thus making it possible to realize a data storing device which is capable of significantly improving entertainment in an virtual creature.

Further, the present invention provides an information processing device with a diagnostic means for diagnosing the gene data of a virtual creature, and a bestowing means for bestowing a predetermined value added on the virtual creature when the gene data satisfies predetermined conditions based on the diagnostic results obtained by the diagnostic means. Consequently, it would be possible to bestow the value added on a virtual creature, different from the shapes and/or behaviors regulated by the gene data of the virtual creature, thereby making it possible to realize an information processing device which is capable of increasingly improving the fun in the virtual creature.

Also, the information processing method according to the A present invention is provided with a first step of diagnosing gene data of the virtual creature, and a second step of bestowing a predetermined value added on the virtual creature when the gene data satisfies predetermined based on the diagnostic result. Consequently, it would be possible to bestow a value added on a virtual creature, different from the shapes and/or behaviors regulated by the gene data of the virtual creature, and to significantly improve the fun in the virtual creature, thus making it possible to realize an information processing method which is capable of increasingly improving entertainment in the virtual creature.

Furthermore, programs in the present invention make a computer execute processing including a first step of diagnosing gene data of a virtual creature, and a second step of bestowing a predetermined value added on the virtual creature when the gene data satisfies predetermined conditions based on the diagnostic result by the diagnostic means. Thereby, the fun in the virtual creature can be improved by bestowing a value added on the virtual creature, different from the shape and/or behaviors regulated by the gene data, thus making it possible to significantly improve entertainment in the virtual creature.

Further, the information processing device according to the present invention is provided with a storage means for storing the information on parents of each registered virtual creature generated by means of sequential mixing and an inquiry means for inquiring into the pedigree of an designated virtual creature based on the information. Thereby, the fun in the virtual creature can be improved, thus making it possible to realize an information processing device which is capable of significantly improving entertainment in the virtual creature.

Furthermore, the information processing method according to the present invention is provided with a first step of storing the information on parents of each registered virtual creature generated by means of sequential mixing and a second step of inquiring into the pedigree of an designated virtual creature based on the information. Thereby, the fun in the virtual creature can be improved, thus making it possible to realize an information processing method which is capable of significantly improving entertainment in the virtual creature.

Furthermore, the programs according to the present invention make a computer execute processing including a first step of storing the information on parents of each registered virtual creature generated by means of sequential mixing and a second step of inquiring into the pedigree of an designated virtual creature based on the information. Thereby, the fun in the virtual creature can be improved, thus making it possible to realize programs which are capable of significantly improving entertainment in the virtual creature.

BRIEF DESCRIPTION OF DRAWINGS

FIG. 5 is a diagram showing a state transition table.

FIG. 10 is a schematic diagram used in explaining the structure of gene data.

FIG. 11 is a schematic diagram showing the data structure in a server.

FIG. 12 is a schematic diagram showing a parent selection screen.

FIG. 14 is a schematic diagram used in explaining the mixing method of genes.

FIG. 16 is a schematic diagram showing a gene data purchase screen.

BEST MODE FOR CARRYING OUT THE INVENTION

Hereinafter, configurations in this invention will be explained with reference to drawings.

(1) First Embodiment
(1-1) Configuration of Pet Robot 1
(1-1-1) Outline of Pet Robot 1

Figure 1:
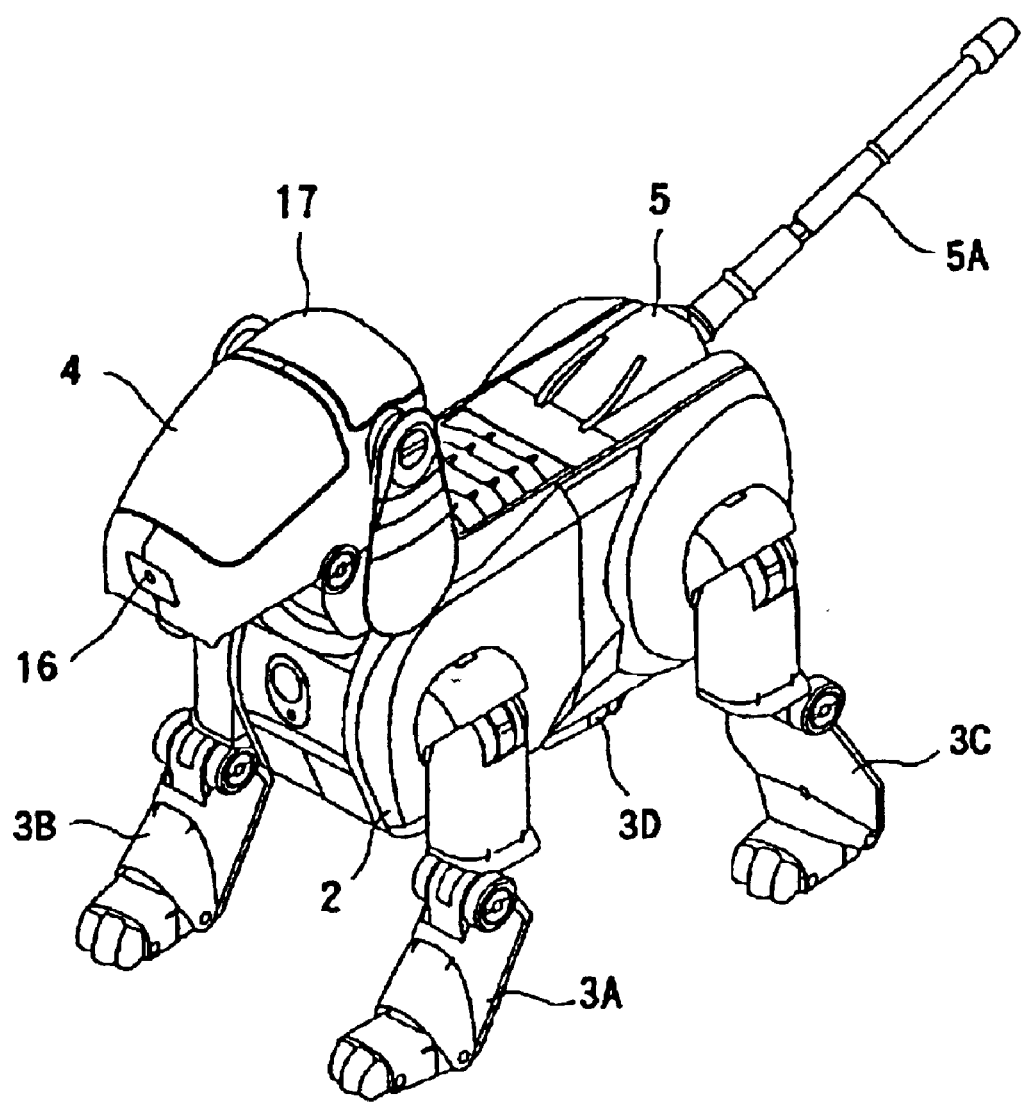
FIG. 1 is a perspective view showing the external structure of a pet robot.

In FIG. 1, reference numeral 1 is a pet robot according to the present invention as a whole and its appearance resembles a dog or cat kept in an ordinary house. That is, the pet robot 1 has a body unit 2 connected with leg units 3A to 3D linked at the front-left, front-right, rear-left, and rear-right, and with a head unit 4 and a tail unit 5 at the front and rear respectively.

Figure 2:
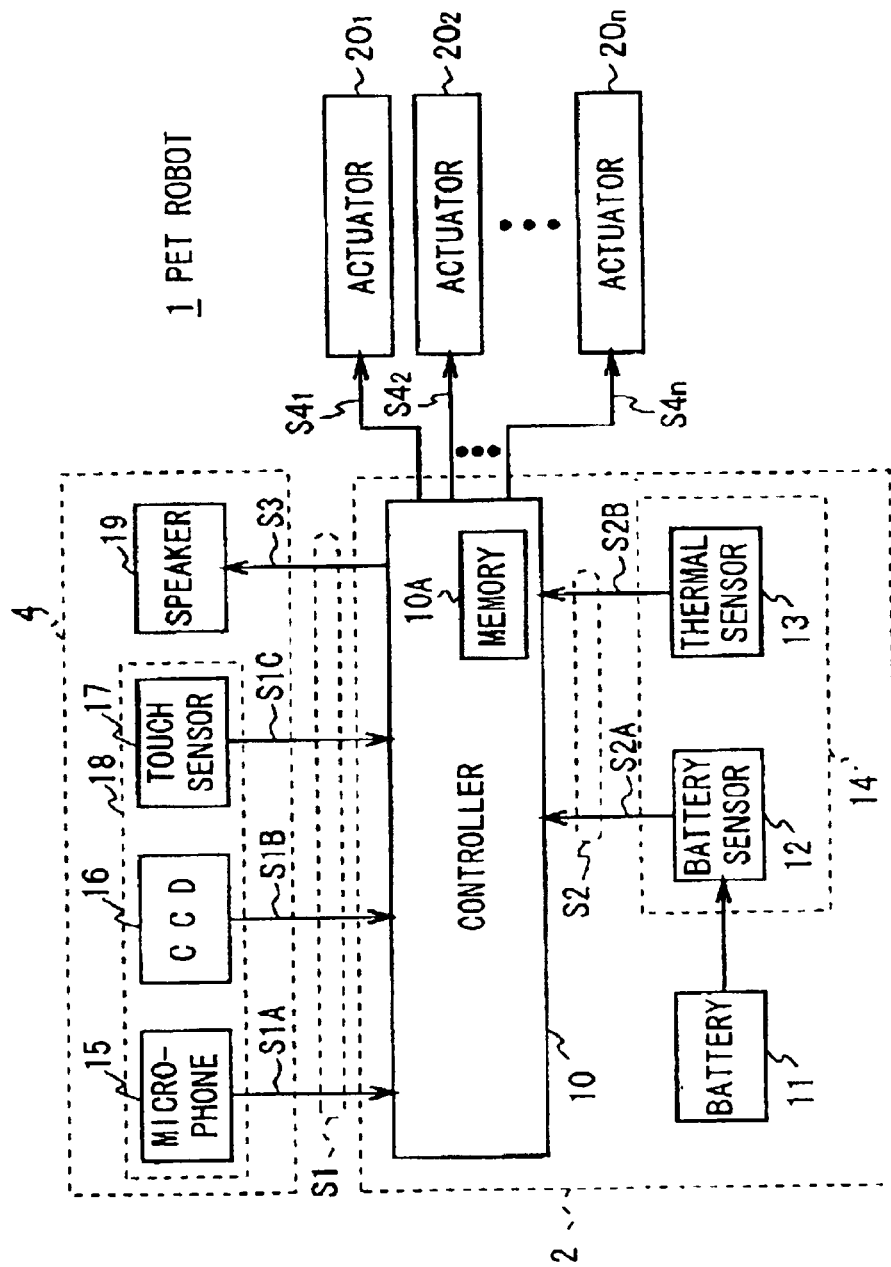
FIG. 2 is a block diagram showing the internal structure of a pet robot.

In this case, the body unit 2 comprises, as shown in FIG. 2, a controller 10 for the overall operation of the pet robot 1, a battery 11 serving as a power source for the pet robot 1, an internal sensor 14 consisting of a battery sensor 12 and a thermal sensor 13.

The head unit 4 comprises an external sensor 18 consisting of a microphone 15 functioning as the "ears" of the pet robot 1, a CDD (Charge Coupled Device) camera 16 functioning as the "eyes" and a touch sensor 17, and a speaker 19 working as the "mouth", each located in place.

Furthermore, actuators $20_1$ to $20_n$ having degree of freedom are placed at the joints of the leg units 3A to 3D, the linkage points of the leg unit 3A to 3D and the body unit 2, the linkage point of the head unit 4 and body unit 2, and the linkage point of a tail 5A of the tail unit 5.

The microphone 15 of the external sensor unit 18 collects command sounds given by a user in terms of music scales from a sound commander (not shown in figure), such as "Walk", "Lie down", or "Chase the ball", the resultant audio signal S1A is supplied to the controller 10. The CCD camera 16 takes a picture of the surroundings, and sends an image signal S1B obtained to the controller 10.

The touch sensor 17, located at the upper part of the head unit 4, as is apparent from FIG. 1, detects pressures which are given as a result of a physical influence such as "stroke" or "pat" exerted by the user, and the detected result is fed to the controller 10 as a pressure detection signal S1C.

The battery sensor 12 of the internal sensor unit 14 detects the residual energy of the battery 11, of which result is sent to the controller 10 as the battery residue detection signal S2A. The thermal sensor 13 detects an internal temperature of the pet robot 1, of which result is sent to the controller 10 as the temperature detection signal S2B.

The controller 10 Judges external and internal conditions and the existence of a command and influence from the user, based on the audio signal S1A, the image signal S1B and the pressure detection signal S1C (these are put together and called "external information signal S1" hereinafter), which are given from the external sensor 18, and the battery residue detection signal S2A and the temperature detection signal S2B (these are put together and called "internal information signal S2" hereinafter), which are supplied by the internal sensor unit 14.

The controller 10 determines the next behavior based on the foregoing judgment result and the control program stored in the memory 10A in advance, and drives necessary actuators $20_1$ to $20_n$ by feeding the driving signals $S4_1$ to $S4_n$ to them based on the judgement result so as to let the pet robot 1 perform behaviors and motions such as swinging the head unit 4 up and down, left and right, wagging the tail 5A of the tail unit 5 and walking by driving the leg units 3A to 3D.

At the same time, the controller 10 generates a audio signal S3 as required, which is fed to the speaker 19 to output sounds outside based on the audio signal S3, and blinks LEDs (Light Emitting Diode, not shown in figure) placed at the "eye" positions of the pet robot 1, in a predetermined pattern.

In this way the pet robot 1 is designed to be capable of acting autonomously responding to situation inside and outside of it and commands and influence by the user.

(1-1-2) Processing by the Controller 10

Explanation is given on the processing by the controller 10 for generating behaviors of the pet robot 1.

Figure 3:
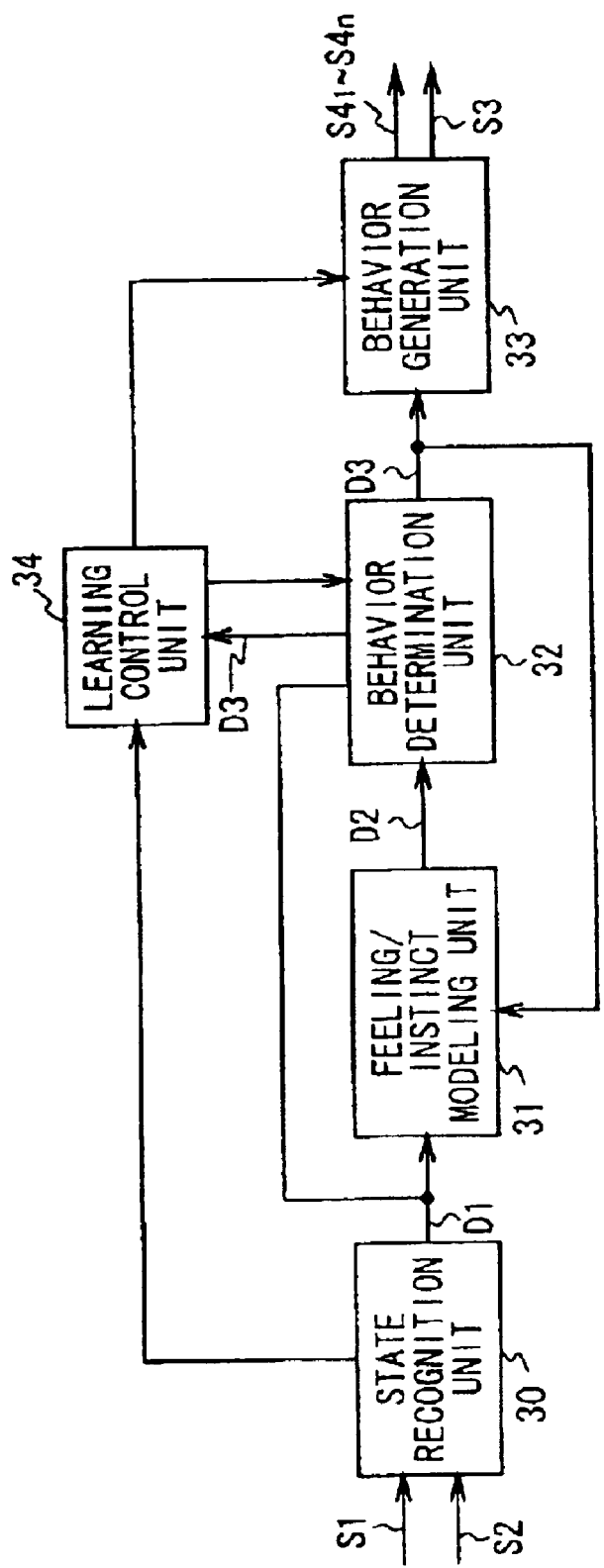
FIG. 3 is a block diagram used in explaining the processing of creating behaviors by a controller.

As shown in FIG. 3, the processing by the controller 10 for generating behaviors of the pet robot 1 is functionally divided into a state recognition unit 30 for recognizing a state, a feeling/instinct modeling unit 31 for determining feelings and instincts based on the results recognized by the state recognition unit 30, a behavior determination unit 32 for determining the subsequent behavior based on the result recognized by the state recognition unit 30 and the feeling and instinct held in the feeling/instinct modeling unit 31, a behavior generation unit 22 to let the pet robot 1 actually do behaviors based on the results determined by the behavior determination unit 33, and a learning control unit 34 for controlling the learning which is described later.

In this case, the state recognition unit 30 inputs an external information signal S1 supplied from the external sensor 18 and an internal information signal S2 given from the internal sensor 14, recognizes a specific external state and internal state, such as "patted", "stroked", "detected a ball", "low battery residue", and "high internal temperature", based on these input signals, and outputs the results to the feeling/instinct modeling unit 31 and the behavior determination unit 32 as recognition information D1.

The feeling/instinct modeling unit 31 determines the feeling and instinct of the pet robot 1 based on the recognition information D1, supplied from the state recognition unit 30, and determined behavior information D3 which is supplied from the behavior determination unit 32 to be described later.

In other words, the feeling/instinct modeling unit 31 has a feeling model holding the total six of parameters, indicating the intensities of "joy", "grief", "surprise", ""fear", "dislike", and "anger", and an instinct model holding the total four of parameters, indicating the intensities of "appetite", "affection", "curiosity", and "desire to move".

And, the feeling/instinct modeling unit 31 periodically renews the corresponding information or parameter values of the feeling model and the instinct model, based on recognition information D1 given from the state recognition unit 30 and the determined behavior information D3 given from the behavior determination unit 32.

Also, when the parameter value of any emotion or desire exceeds the value preset in advance for emotion or desire, a result of the renewal processing, the feeling/instinct modeling unit 31 outputs that value to the behavior determination unit 32 as the feeling/instinct information D2.

The behavior determination unit 32 determines a subsequent behavior based on the recognition information D1, which is given from the state recognition unit 30, the feeling/instinct information D2, which is given from the feeling/instinct modeling unit 31, and a behavior model which is stored as control data in the memory 10A (FIG. 2) in advance, the result of which is output to the feeling/instinct modeling unit 31 and the behavior generation unit 33 as the determined behavior information D3.

Figure 4:
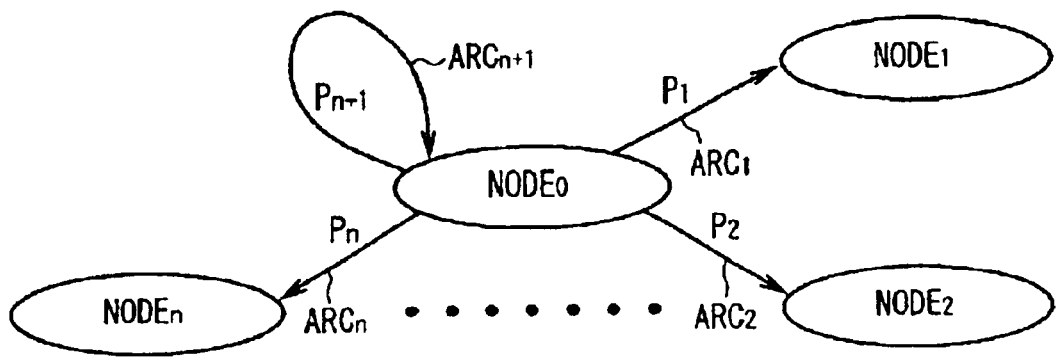
FIG. 4 is a conceptual diagram showing probability automaton.

In the case of this pet robot 1, the behavior determination unit 32 uses, as a means for determining the next behavior or motion, an algorithm called "probability automaton" which is to probably determine which node $NODE_0$ to $NODE_n$, the same or another, a particular node (state) $NODE_0$ to $NODE_n$ as shown in FIG. 4 shifts to based on arcs $ARC_1$ to $ARC_{n+1}$ connecting between the nodes $NODE_0$ to $NODE_n$.

More concretely, the memory 10A stores a state transition table shown in FIG. 5 for each node $NODE_0$ to $NODE_n$ as a behavior model, and the behavior determination unit 32 determines the next behavior based on this state transition table 35.

In the state transition table 35, the input events (recognition results by the state recognition unit) are enumerated in the "Input Event" line in order of priority, as transition conditions in the node $NODE_0$ to $NODE_n$, and further conditions regarding the transition conditions are described on the corresponding columns in the "Data Name" and "Data Range" lines.

Accordingly, in the node $NODE_{100}$ in the state transition table 35 in FIG. 5, in the case of giving a recognition result "detected a ball (BALL)" (recognition information D1), this recognition itself and an event given at the same time that the "size" of the ball given is within the range of "from 0 to 1000 (0,1000)" is the condition for the current node $ND_{100}$ to shift to another node. Likewise, in the case of giving a recognition result "detected an obstacle (OBSTACLE)", this recognition result itself and an event given at the same time that the "distance (DISTANCE)" to the obstacle is within the range of "from 0 to 100 (0, 100)" is the condition for the current node $ND_{100}$ to shift to another node.

Also, if there is no recognition result input into the node $NODE_{100}$, $NODE_{100}$ can shift to another node if any parameter value of "joy (JOY)", "surprise (SURPRISE)", or "sadness (SADNESS)" is 'within the range of from 50 to 100 (50, 100), out of the parameter values of the emotions and desires of the feeling model and instinct model of the feeling/instinct modeling unit 31 to which the behavior determination unit 32 periodically refers.

In addition, in the state transition table 35, the names of nodes, to which a node $NODE_0$ to $NODE_n$ is allowed to shift, are enumerated on the row of "Nodes to which the current node can transit" in the column of the "transition probability to other nodes", and enumerated on the row of "Output Actions" in the column of the "Transition Probability to Other Nodes" are the transition probabilities to other nodes, at which transition is made when all the conditions listed on each line of the "Names of Input Events", "Data Name" and "Range of Data" are satisfied. Note that, the sum of the transition probabilities on each line in the column of the "Transition Probability to Other Nodes" is 100 [%].

Accordingly, in the node $NODE_{100}$ indicated in the state transition table 35 in FIG. 5, if the recognition results are given for example that "the ball has been detected (BALL)" and that the "SIZE" of the ball is within the range of from 0 to 1000 (0,1000), the node can shift from the $NODE_{100}$ to the "$NODE_{120}$ (node 120)" with a transition probability of "30 [%]", and the behavior of the 'ACTION 1' is done at this time.

The behavior model is formed so that a number of nodes $NODE_0$ to $NODE_n$ described in such a state transition table 35 are connected to each other. Thus, the behavior determination unit 32 probably determines the next behavior using the state transition table 35 of the current node $NODE_0$ to $NODE_n$ stored in the memory 10A, when the recognition information D1 is given from the state recognition unit 30 or when the feeling/instinct information D2 is given from the feeling/instinct modeling unit 31, the result of which is output as determined behavior information D3 to the feeling/instinct modeling unit 31 and the behavior creation unit 33.

The behavior generation unit 33 comprises inside the memory 10A, a motion data file (this is called "motion file" hereinafter) which consists of control data for each behavior that the pet robot 1 can make, and a sound data file (this is called "sound file" hereinafter) which consists of control data for each sound that the pet robot can output. Note that, the motion file and sound file include the motion data of motions and the sound data of sounds, which are created by the user.

When the determined behavior information D3 is given from the behavior determination unit 32, the behavior generation unit 33 retrieves corresponding motion data or sound data of the motion file and the sound file, which are stored in the memory 10A, and based on the motion data or the sound data, supplies drive signals $S4_1$ to $S4_n$ to proper actuators $20_1$ to $20_n$ to drive them (FIG. 2), generates and outputs the audio signal S3 to the speaker 19 (FIG. 2), or blinks the LEDs, which are located at the positions of the "eyes". In this way, the behavior generation unit 33 lets the pet robot 1 perform behaviors determined by the behavior determination unit 32.

On the other hand, upon recognizing actions such as "stroked" or "patted" based on the pressure detection signal S1C (FIG. 2) given from the touch sensor 17 (FIG. 2) out of the external information signal S1, the state recognition unit 30 notifies the learning control unit 34 of it.

At this time, the learning control unit 34 stores the present and past behaviors of the pet robot 1 based on the deter- mined behavior information D3 given from the behavior determination unit 32. Then, when the recognition result "stroked" is given from the state recognition unit 30 as the recognition information D1 while the pet robot 1 is acting, the learning control unit 34 notifies the behavior determination unit 32 of it.

Based on the above notification, the behavior determination unit 32 decreases by a predetermined amount transition probabilities $P_1$ to $P_{n+1}$ corresponding to the current action in the state transition table 35 about the corresponding node $NODE_1$ to $NODE_n$ of the behavior model stored in the memory 10A, while increasing each of the transition probabilities $P_1$ to $P_{n+1}$ on the same line in the state transition table 35 by as much amount as decreased.

Meantime, when a recognition result "patted" is given from the state recognition unit 30 as the recognition information D1 while the pet robot 1 is acting, the learning control unit 34 notifies the behavior determination unit 32 of it.

Then, based on the above notification, the behavior determination unit 32 increases by a given amount transition probabilities $P_1$ to $P_{n+1}$ corresponding to the current action in the state transition table 35 about corresponding node $NODE_1$ to $NODE_n$ (a node $NODE_1$ to $NODE_n$ before transition to the current node $NODE_1$ to $NODE_n$) stored in the memory 10A, while decreasing each of the corresponding transition probabilities $P_1$ to $P_{n+1}$ on the same line in the state transition table 35 by as much amount as increased.

According to the controlling described above, when the pet robot 1 is patted, the transition probabilities $P_1$ to $P_{n+1}$ corresponding to that behavior in the corresponding state transition table 35 decreases, thereby making it harder for the pet robot 1 to act. On the other hand, when the pet robot 1 is stroked, the transition probabilities $P_1$ to $P_{n+1}$ corresponding to that behavior in the corresponding state transition table 35 increases, thereby making it easier for the pet robot 1 to act. As a result, the behaviors (character) of the pet robot 1 can vary as if the pet robot 1 changed its own behaviors (character) in accordance with the training by the owner, like a real animal.

In this way, the controller 10 is designed to let the pet robot 1 act autonomously while learning in response to actions exerted by the user.

(1-2) Structure of Network System 40 in this Embodiment
(1-2-1) Structure of Network System 40

Figure 6:
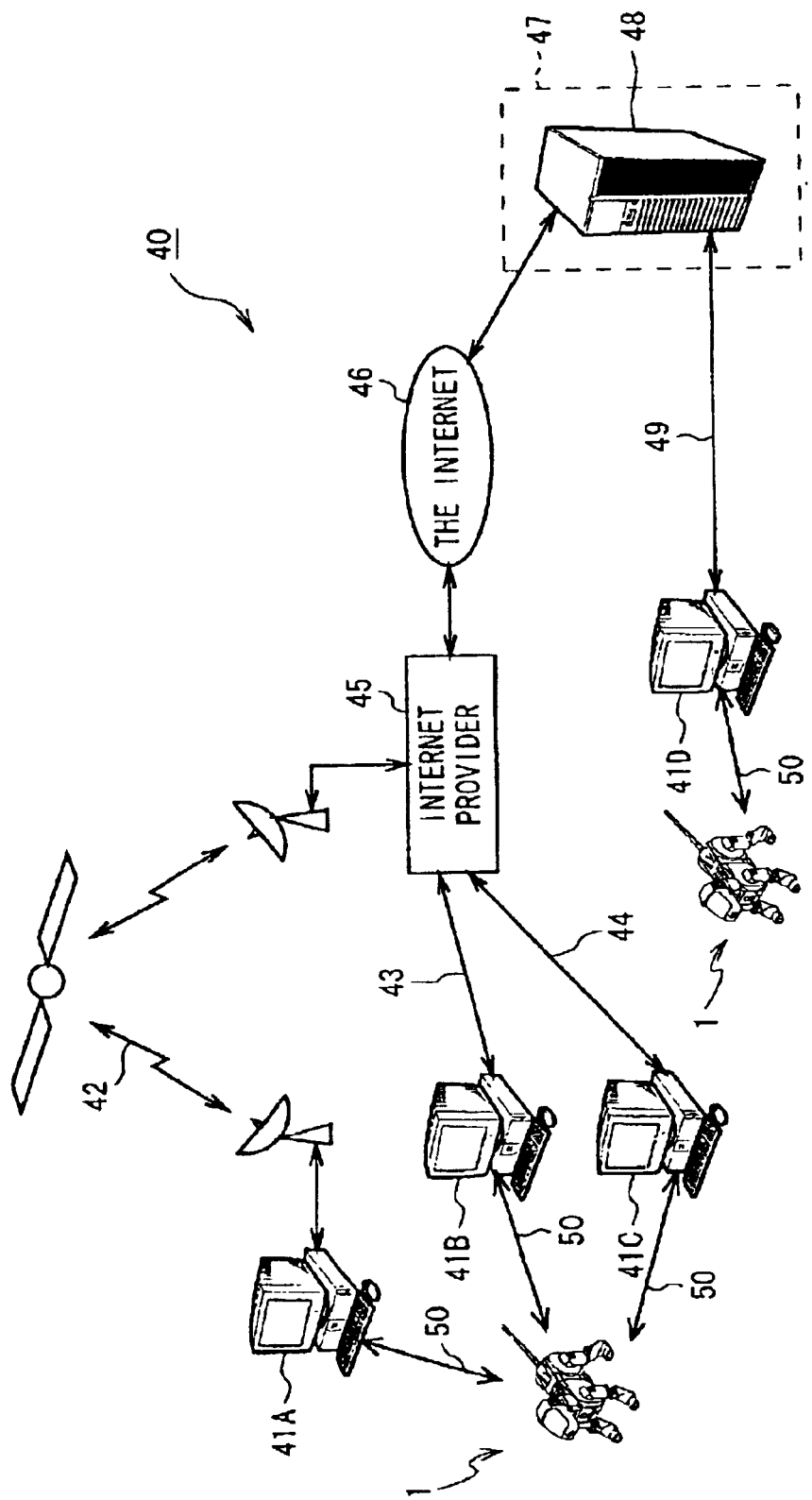
FIG. 6 is a block diagram showing a network system in the first mode of embodiment.

FIG. 6 shows a network system 40 which is designed to provide a gene data sale service of customizing and selling genetic (DNA: deoxyribonucleic acid) data, which is mentioned later, of a pet robot 1 in accordance with a user's desire, a pedigree issue service for issuing a pedigree to the pet robot 1, an emblem issue service for issuing an emblem corresponding to the pedigree of the pet robot 1, and a pedigree inquiry service for inquiring into the pedigree of the pet robot 1.

In such a network system 40, personal terminals 41A to 41C are connected to an Internet provider 45 with a satellite communication line 42, a cable television line 43, or a telephone line 44, and the Internet provider 45 to the server 48 of a service company 47 over the Internet 46. Furthermore, a personal terminal 41D is connected directly to the server 48 with a general public line 49 such as a public telephone line.

In this case, each personal terminal 41A to 41D is an ordinary personal computer installed in an ordinary house, which is capable of transmitting/receiving necessary data to/from the server 48 over the Internet 46 or through general public line 49, or capable of retrieving necessary data from the memory 10A of the electrically connected pet robot 1 with the cable 50 or something, or capable of writing necessary data into the memory 10A.

The server 48 is a WWW (World Wide Web) server which performs various processing when the service company 47 provides the gene data sale service, the pedigree issue service, the emblem issue service and the pedigree inquiry service. The server 48 transfers a variety of screen data and necessary image data, which are described later, to a personal terminal 41A to 41D accessing the server 48 over the Internet 46 or through the general public line 49, in order to display a screen or an image based on these screen data or image data on the display of the personal terminal 41A to 41D.

Figure 7:
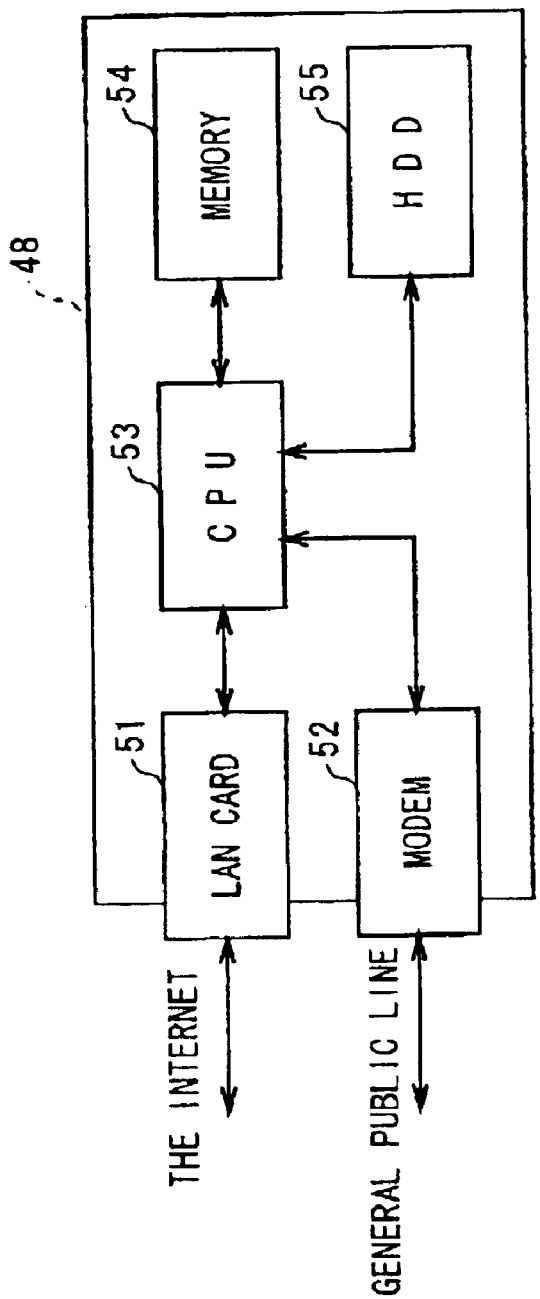
FIG. 7 is a block diagram showing the outline of the structure of a server.

The outline of the structure of the server 48 is shown in FIG. 7. As is apparent from FIG. 7, the server 48 consists of a LAN (Local Area Network) card 51 having an interface circuit for the Internet 46, a modem 52 as an interface circuit for the general public line 49, a CPU 53 for controlling the whole server 48, a memory 54 as a working memory of the CPU 53, and a hard disk drive 55 for recording a variety of programs and data for various processing by the server 48, which is be described later, and for recording other necessary data.

In this case, the CPU 53 captures into itself, via the LAN card 51 or the modem 52, data and commands supplied from a personal terminal 41A to 41D accessing the server 48 over the Internet 46 or through the general public line 49, and performs predetermined processing based on the data, the command, and the programs stored in the hard disk drive 55.

Also, based on the result of the above processing, the CPU 53 sends screen data for a variety of screens, which is described later, other data, programs, and commands, to appropriate personal terminals 41A to 41D via the LAN card 51 or the modem 52.

(1-2-2) Registration of Gene Data

Next, the gene data sale service, the pedigree issue service, the emblem issue service, and the pedigree inquiry service in the network system 40 will be explained.

Figure 8:
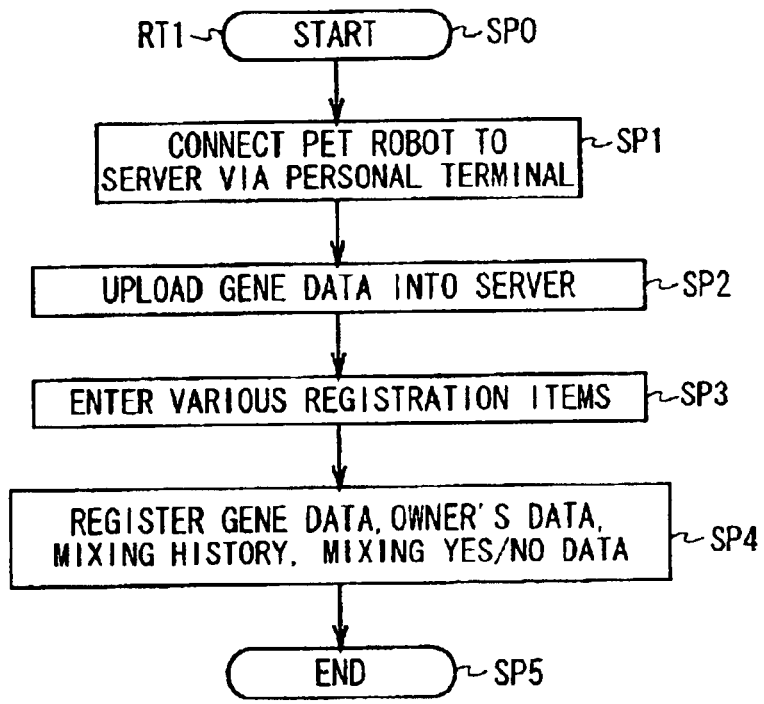
FIG. 8 is a flowchart showing a gene data registration procedure.
Figure 9:
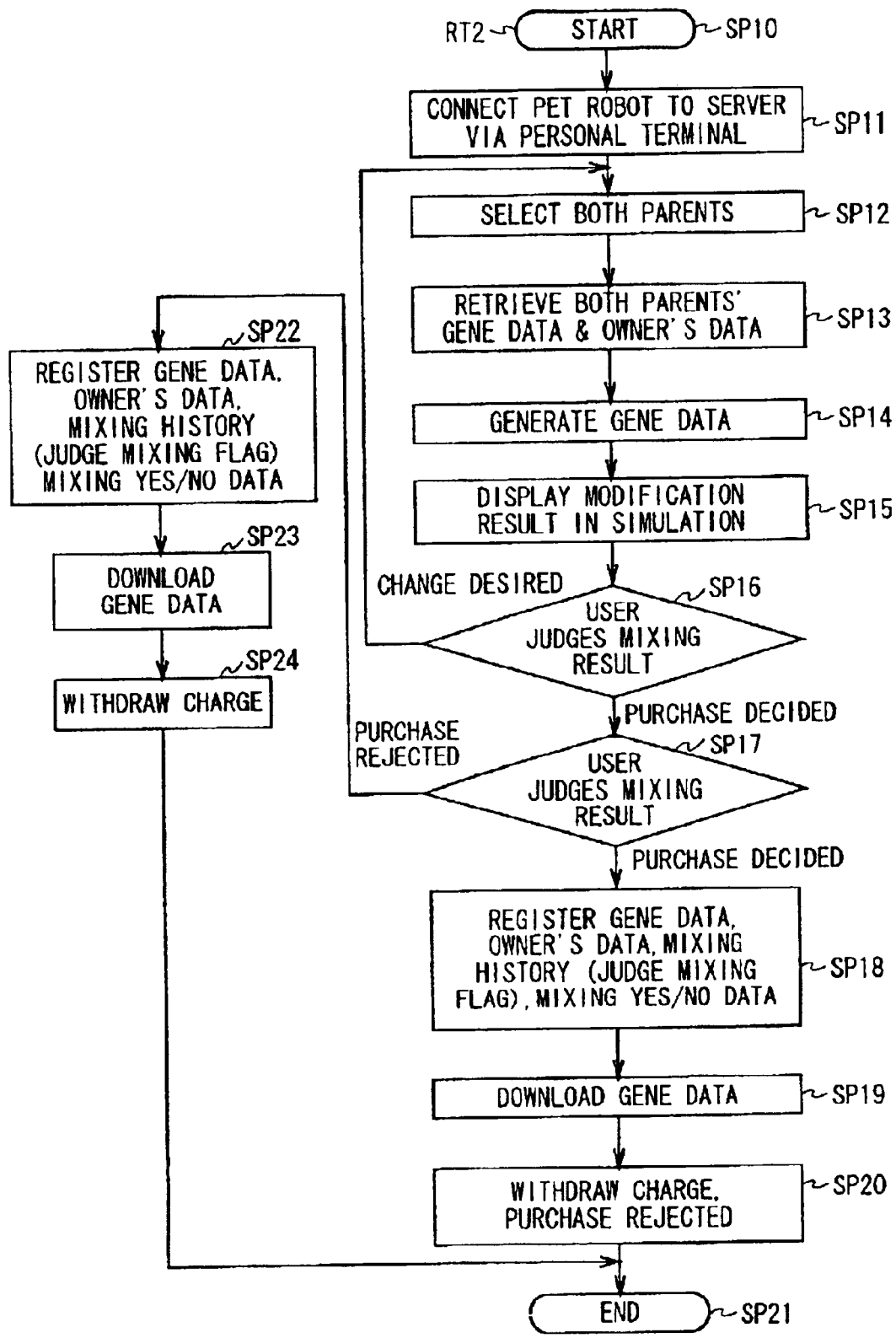
FIG. 9 is a flowchart showing a gene data purchase procedure.
Figure 13:
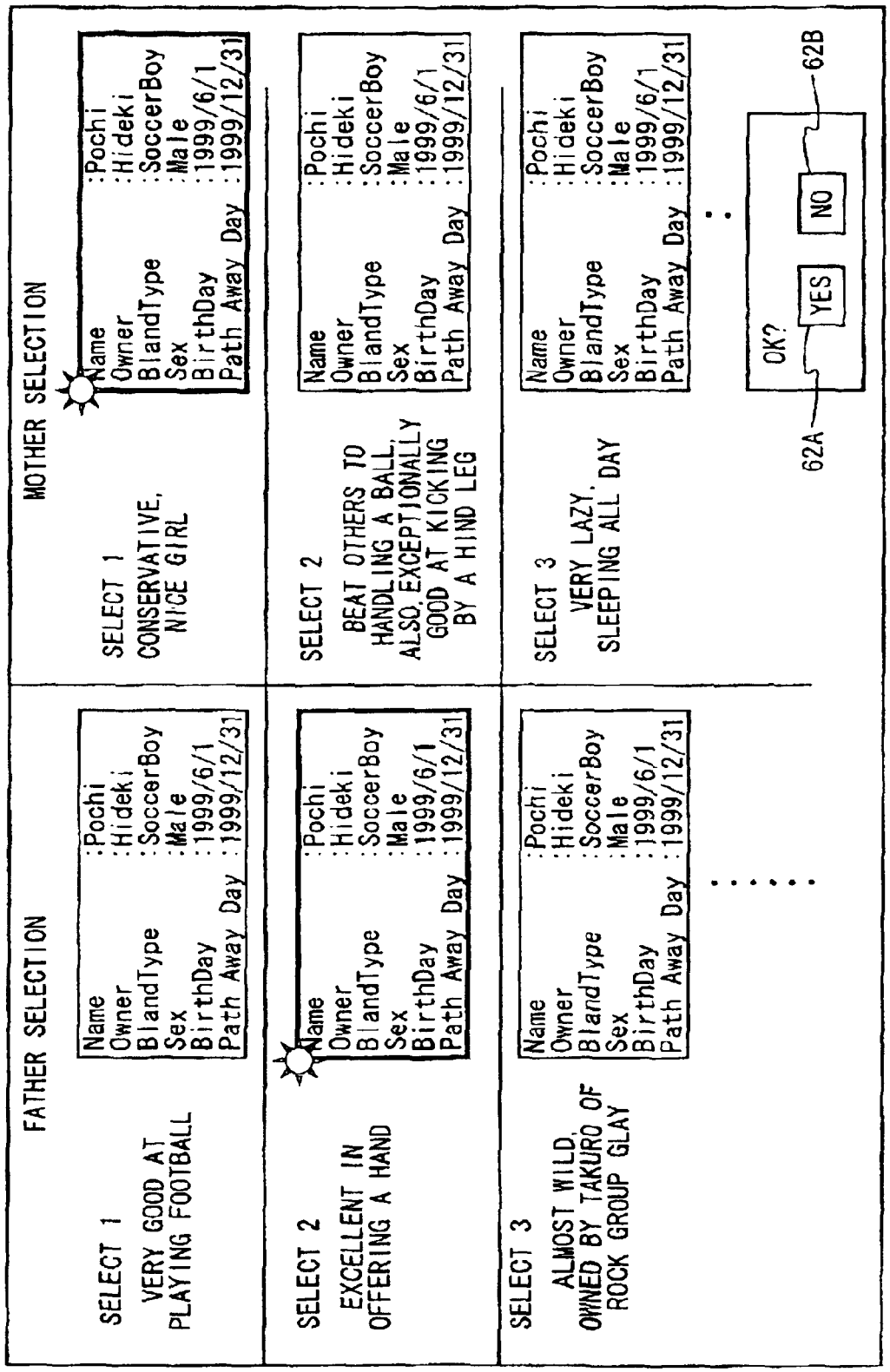
FIG. 13 is a schematic diagram showing a parent confirmation screen.
Figure 17:
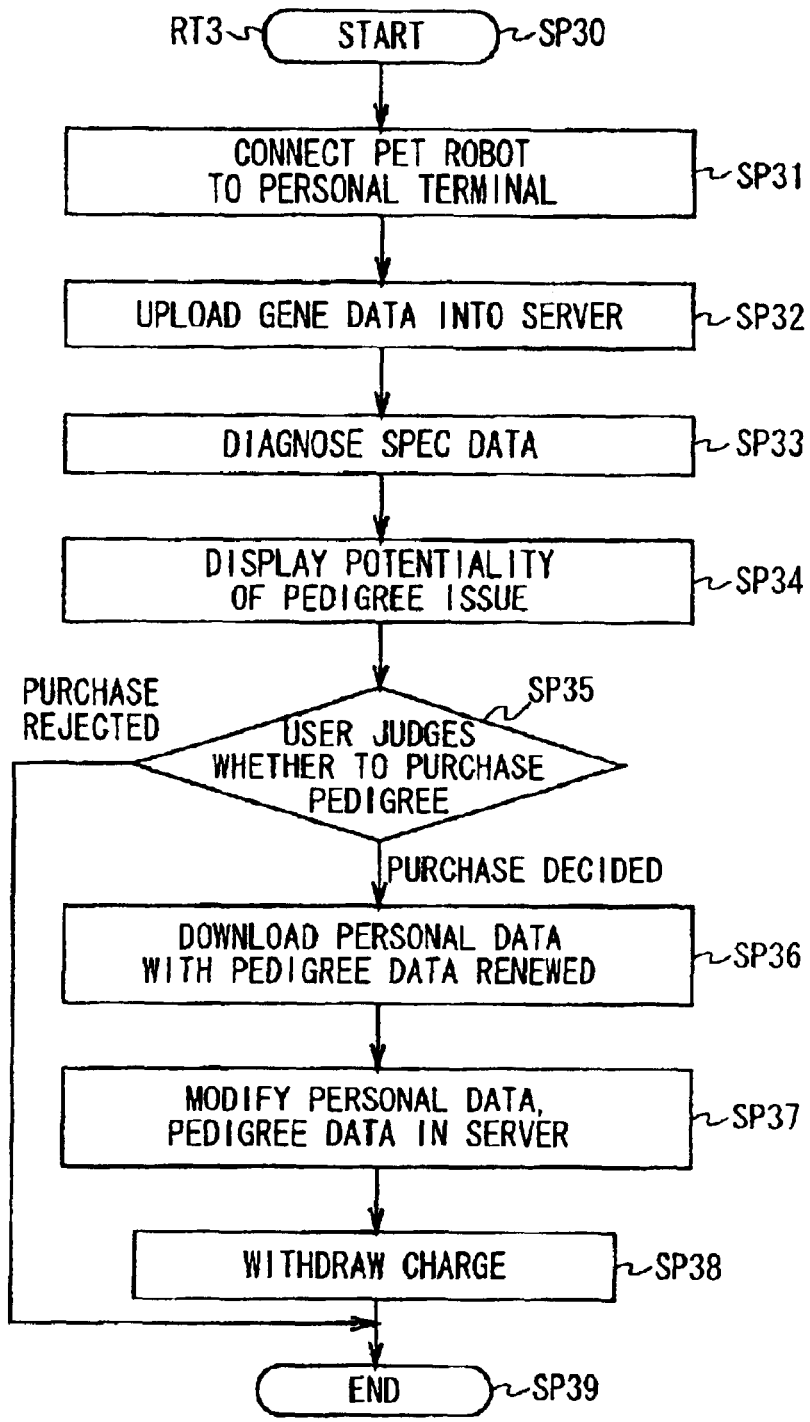
FIG. 17 is a flowchart showing a pedigree issue procedure.
Figure 20:
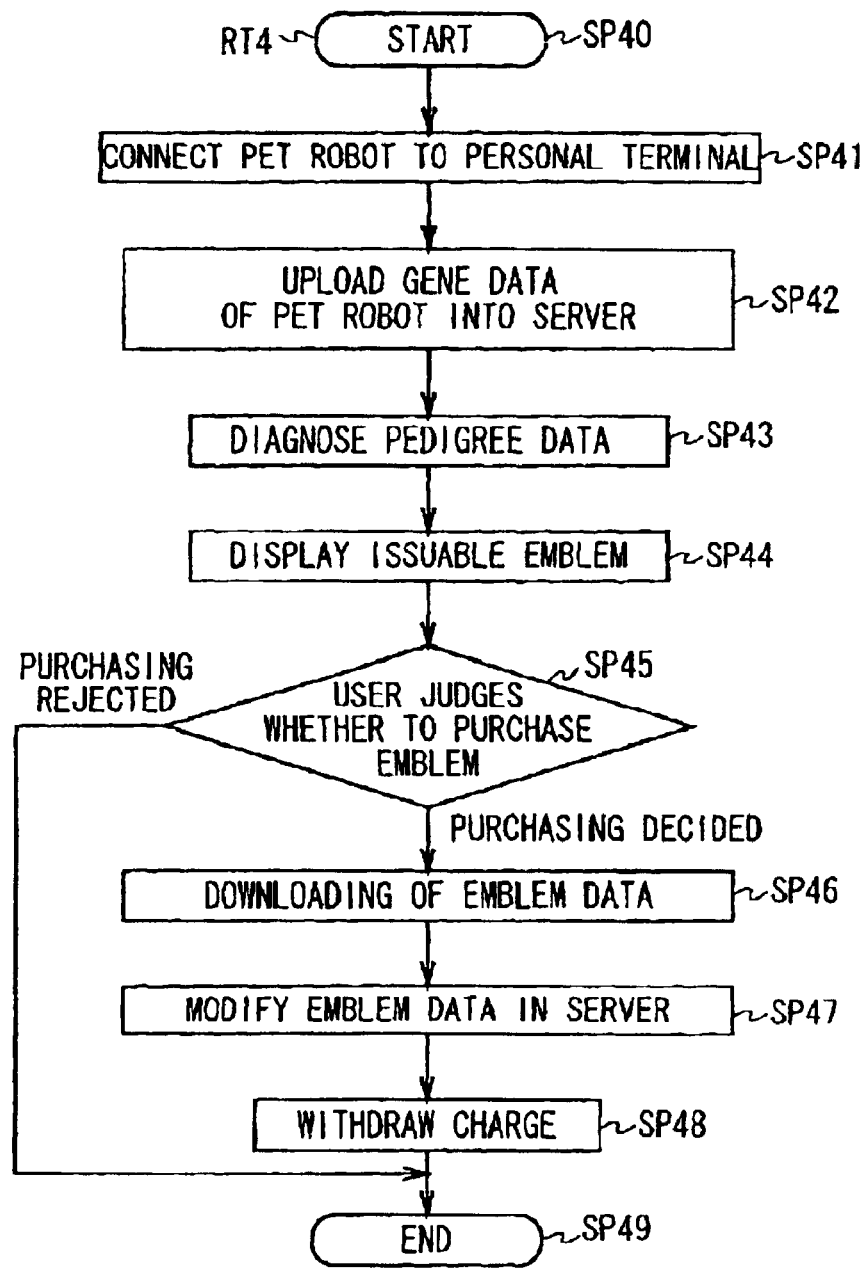
FIG. 20 is a flowchart showing an emblem issue procedure.
Figure 23:
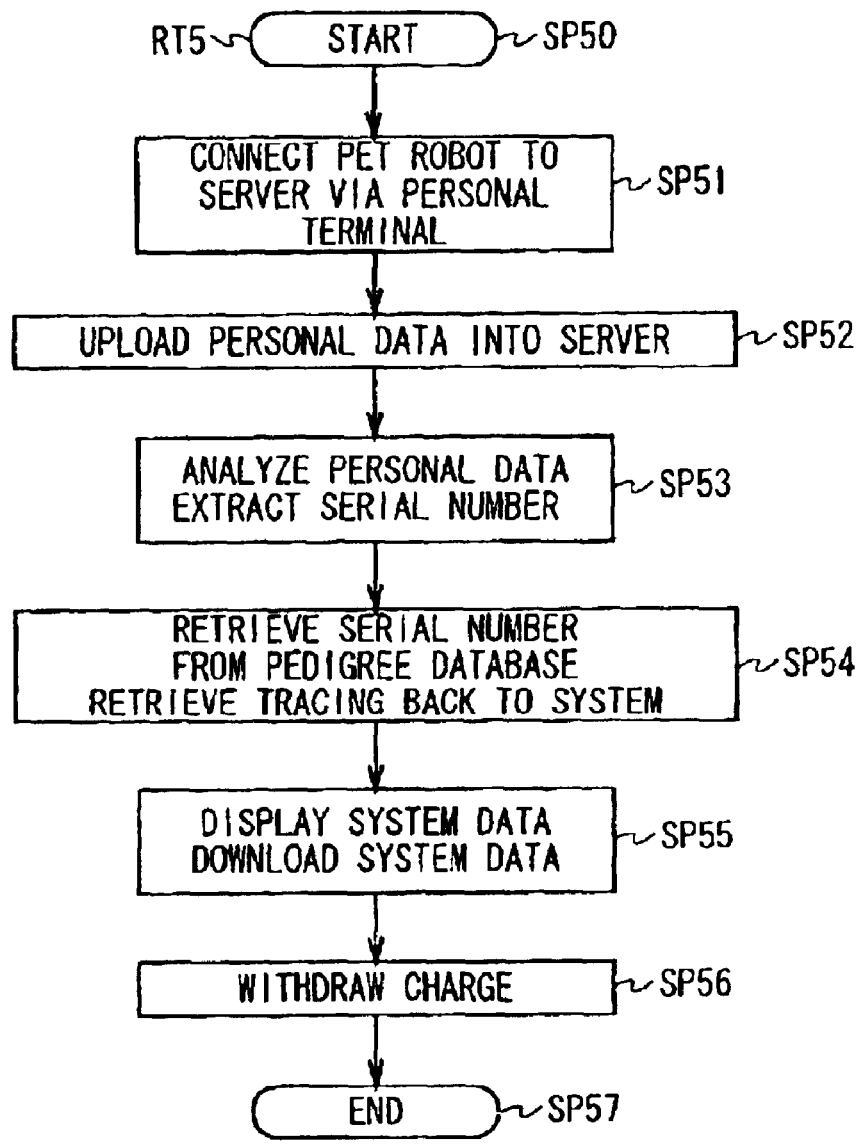
FIG. 23 is a flowchart showing a pedigree inquiry procedure.

This network system 40 is designed so that gene data of the pet robot 1 can be registered to the server 48 in accordance with a gene data registration procedure RT1 shown in FIG. 8, the user who made a registration can purchase new gene data obtained by mixing desired two pieces of gene data registered in the server 48, in accordance with a gene data purchase processing procedure RT2 shown in FIG. 9, the user who made a registration can purchase the pedigree and the emblem corresponding to the characters of the pet robot 1, in accordance with a pedigree issue procedure RT3 shown in FIG. 17 and an emblem issue procedure RT4 shown in FIG. 20, and the pedigree of the pet robot 1 can be inquired in accordance with the pedigree inquiry procedure RT5 shown in FIG. 23.

The gene data of the pet robot 1 is explained here. As shown in FIG. 10, gene data consisting of three kinds of data, namely personal data, pedigree data, and spec data, are stored in the memory 10A of the pet robot 1.

In this case, the personal data is personal information on the pet robot 1 and its owner, and consists of such data as the serial number of the pet robot 1, the name of pet robot 1, the image of the pet robot 1, the name of the owner, the existence of a pedigree which is described later, the name of a pedigree if there is one, the sex (male or female) of the pet robot 1, the manufacture date of the pet robot 1, and the date of the pet robot 1's death (if there is the concept of death). Of the personal data, the name of the pet robot 1, the image of the pet robot 1, and the name of the owner, etc. are entered by the user with a personal terminal 41A to 41D.

The pedigree data is the one indicating the pedigree of the pet robot 1 in the case that the gene data of the pet robot 1 is created by mixing, which is described later, and consists of a pedigree file storing the personal data of two pet robots 1 which are parents of the pet robot 1.

Furthermore, the spec data is a variety of control data to let the pet robot 1 act autonomously, and consists of the aforementioned motion data, sound data, and behavior model data (data in the state transition table 35 (FIG. 5) of each node $NODE_1$ to $NODE_n$).

A user wishing to resister the gene data of his pet robot 1 into the server 48, in accordance with the gene data registration procedure RT1 shown in FIG. 8, first connects the pet robot 1 to the server 48 with a personal terminal 41A to 41D (SP1), and then reads out gene data stored in the memory 10A of the pet robot 1 by performing predetermined operations using a registration screen (not shown in figure) on the display of the personal terminal 41A to 41D, and uploads the read data into the server 48 (step SP2).

Subsequently, the user enters data, such as the data of the owner and mixing yes/no data, needed for registration using the registration screen (step SP3). In this case, the data of the owner consists of the name of the owner of the pet robot 1, the owner's image which is a photo, a video image or the 3-dimensional image by the VRML (Virtual Reality Modeling Language), the URL (Uniform Resource Locator) of the owner's homepage if the owner has a homepage, the sex, the age, the occupation, and the domicile (country, address, et al.) of the owner. The mixing yes/no data consists of such data as on whether or not mixing is permitted and the price of mixing, which is mentioned later.

When such owner's data and mixing yes/no data is finished to enter, as shown in FIG. 11, the CPU 53 (FIG. 7) of the server 48 stores the gene data of the pet robot 1, the data of the owner, the mixing yes/do data, and the mixing history including the past mixing history (parents' history, etc.) in the lineage of the pet robot 1 in the form of database into the hard disk drive 55 (FIG. 77). In this way, the gene data of the pet robot 1 is registered in the server 48, in relation with the data of the owner, the mixing history and the mixing yes/no data (step SP4).

(1-2-3) Gene Data Sale Service

On the other hand, the user who registered the gene data of the pet robot 1 is able to enjoy a sale service of new gene data obtained by mixing two pieces of desired gene data registered in the server 48.

In practice, in this network system 40, a user wishing such a service firstly connects his pet robot 1 to the server 48 with the personal terminal 41A to 41D (step SP11), in accordance with the gene data purchase processing procedure RT2 shown in FIG. 9.

Subsequently, the user selects desired pet robots 1 as parents on the parent selection screen 60 as shown in FIG. 12, displayed on the display of the personal terminal 41A to 41D (step SP12).

In practice, in this parents selection screen 60, there are two ways to select desired parents: a direct selection method to retrieve and select desired pet robots 1 as the parents using the name of an owner, the name of a pet robot 1, its functions, domicile, the occupation of the owner, and the like; and an indirect selection method to select desired parents by answering various questions on the pet robot 1 and the user himself, from pet robots recommended by the service company 47, or from newly coming pet robots recommended by the service company 47.

Then, the user can designate the conditions of pet robots to be desired parents, by performing predetermined operations on the parent selection screen 60, by means of either the direct selection method or indirect selection method.

At this time, the CPU 53 of the server 48 retrieves candidate pet robots 1 for a father and a mother matching the designated conditions, from the gene data of the pet robots 1, and the data of the owners, etc., registered (step SP13), and display the retrieval result as a parents confirmation screen 61 shown in FIG. 12 on the display of the personal terminal 41A to 41D.

Thus, the user can select one pet robot 1 for each of a future father and mother from among pet robots 1, candidate fathers and mothers, using the parent confirmation screen 61 and can select the parents by clicking the YES button 62A out of the YES button 62 and NO button 62B displayed on the parent confirmation screen 61. In this parent confirmation screen 61, the click of the NO button 62B returns the screen to the parent selection screen 60.

When parents are selected by the user using the parent confirmation screen 61, the CPU 53 of the server 48 reads out the gene data of each pet robot 1 selected as the father or mother from the hard disk drive 55, and creates new gene data by performing the mixing processing on the read gene data of two pet robots 1 as shown in FIG. 14 (step SP14).

In concrete, the CPU 53 of the server 48 newly issues, for example, the serial number of the pet robot 1 and the manufacture data of the pet robot 1 out of the personal data, and determines the sex of the pet robot 1 at random, and stores them in the corresponding parts of the new gene data. Also, the CPU 53 stores the personal data of the parent pet robots 1 as the pedigree data in the corresponding parts of the new gene data.

Furthermore, by integrating or polarizing as spec data, data such as motion data, sound data, and recognizable object data kept by the parents and data such as a motion model to determine the character of the pet robot 1, the CPU 53 creates new data such as motion data, sound data and recognizable object data and data such as a motion model to determine the character, and stores them in the corresponding parts of the new gene data.

Such a method can be used as a method of integrating and polarizing motion data and others kept by the parent pet robots 1 that: regarding the motion models for example, when the pet robot of a future father has motion data for each of the behaviors "M1", "M2", "M3", and "M4", and the pet robot of a future mother has motion data for each of the behaviors "M3", "M4", "M5", and "M6", behaviors can be selected at random out of the uncommon behaviors "M1", "M2", "M5", and "M6", leaving the common motion data of the behaviors "M3" and "M4" as it is. In addition, a similar method can be applied to sound data and the data of recognizable objects.

Furthermore, another method of integrating and polarizing data to determine the character of the pet robot 1 is to define the average value of the transition probabilities $P_1$ to $P_{n+1}$ of the father and mother as the transition probabilities $P_1$ to $P_{n+1}$ (FIG. 4) of the behavior models of the parent pet robots 1, for example.

Figure 15:
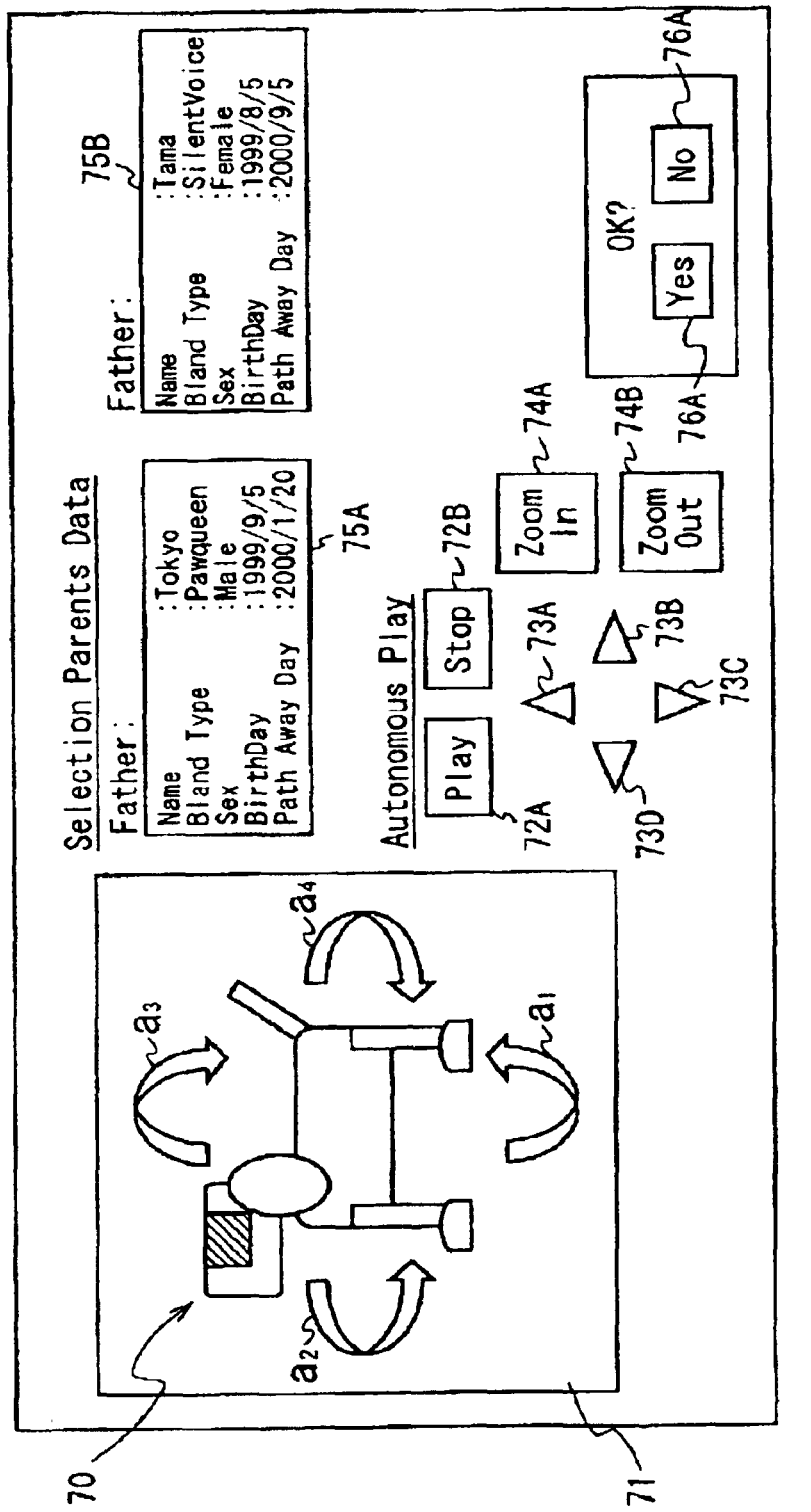
FIG. 15 is a schematic diagram showing a simulation screen.

Then, upon creating new gene data by means of such a mixing process, the CPU 53 of the server 48 transmits screen data to the corresponding personal terminal 41A to 41D, to display a simulation screen 62 as shown in FIG. 15 on the display of the personal terminal 41A to 41D (step SP15).

This simulation screen 62 is a screen to show the simulation of what behaviors the pet robot 1 vested with the new gene data obtained by the above mixing process actually performs, and the 3-dimensional image picture 70 of the pet robot 1 is displayed in the preview portion 71.

On this simulation screen 62 has a play button 72A and a stop button 72B on the right of the preview portion 71. The pressing of the play button 72A can have a 3-diminsitonal image picture 70 displayed on the preview portion 71 act autonomously based on the gene data newly created in the aforementioned method, and the pressing of the stop button 72B can have the 3-dimensional image 70 stop acting.

Also, the pressing of a first to forth rotary buttons 73A to 73D displayed at the bottom and on the right of this simulation screen 62 can turn the 3-dimensional image 70 displayed on the preview portion 71 in the corresponding direction (arrows $a_1$ to $a_4$), and the 3-demensional image 70 can be enlarged or reduced by pressing a zoom-in button 74A or a zoom-out button 74B displayed on the right side of the first to fourth rotary buttons 73A to 73D.

Also, displayed in the father information display column 75A and the mother information display column 75B on this simulation screen 62 is brief information on the names, the pedigrees, the sex, and the birthdays (manufactures dates) of the father and mother pet robots 1.

Then, the user is to judge whether the specifications of gene data to purchase is acceptable, based on the behavior patterns of the 3-dimensional image 70 displayed on this simulation screen 62 (step SP16).

When the user does not like the specifications, he may just click the NO button 76B on this simulation screen 62, then the aforementioned parent selection screen 60 appears again on the display of the personal terminal 41A to 41D based on the screen data to be transmitted from the server 48. Thus, the user can select parents again with this parent selection screen 60.

In the meantime, the user clicks the YES button 76A when he likes the specifications. In this case, a gene data purchase screen 80 as shown in FIG. 16 based on the screen data which is transmitted from the server 48 is displayed on the display of the personal terminal 41A to 41D, in place of the simulation screen 62.

This gene data purchase screen 80 just shows at the initial stage a message "purchase data?", and the YES button 81A and NO button 81B to response to the message. When the user clicks the NO button 81B under this condition, the CPU 53 of the server 48 terminates all processing, and lets the personal terminal 41A to 41D display the initial screen by transmitting predetermined screen data to a proper personal terminal 41A to 41D.

In the meantime, when the user clicks the YES button 80A, a message "purchase pedigree?", and the YES button 82A and NO button 82B to respond the message are displayed on the gene data purchase screen 80.

The user judges whether to purchase the pedigree (step SP17), and clicks the NO button 82B if he does not want to purchase it, and clicks the YES button 82A if he want to purchase it.

When the YES button 82A is clicked, the CPU 53 of the server 48 extracts the characteristics of the gene data (e.g., "versatile", "docile", "active") based on the motion data, the sound data, and the model data, etc. included in the spec data of the new gene data, and also create the name of the pedigree suitable for the extracted characteristics. As occasion arises, the CPUT 53 edits the portions of the existence of the pedigree and the name, which is the personal data, in the gene data, based on the results of the above processing.

Also displayed on the gene data purchase screen 80 are a message "permit mixing for baby?", and the YES button 83A and NO button 83B to respond the message.

Then, the user clicks the YES button 83A when permitting the above mixing using this new gene data, and clicks the NO button 83B when not permitting.

As a result, the CPU 53 of the server 48 creates the mixing yes/no data on the new gene data in response to the pressing of the YES button 83A or NO button 83B.

Furthermore, displayed on the gene data purchase screen 80 are a message "Download baby program?", and the YES button 84A and NO button 84B to respond the message.

And, all the user has to do is click the NO button 84B when not downloading the new gene data into the pet robot 1 via the personal terminal 41A to 41D, then the CPU 53 of the server 48 terminates all the processes, and lets the display of the personal terminal 41A to 41D show the initial screen by transmitting predetermined screen data to the personal terminal 41A to 41D.

To respond it, the user clicks the YES button 84A when downloading the new gene data into the pet robot 1 with the personal terminal 41A to 41D.

At this time, the CPU 53 of the server 48 stores and registers this new gene data (step SP18) into the hard disk drive 55 in the form of database, in relation with the mixing history, the mixing yes/no data, and the corresponding owner's data obtained at the time of the registration mentioned above in FIG. 8, and writes this gene data into the memory 10A of the pet robot 1 via the corresponding personal terminal 41A to 41D.

When the downloading is finished, subsequently displayed on the gene data purchase screen 80 are a message "Finished downloading. Your baby's data is shown on the right", brief information and comment on the new gene data, and service charge. And, this charge is withdrawn later from the bank account of the user who used this service.

On the other hand, when the user does not purchase the pedigree (with the NO button 82B clicked) on the gene data purchase screen 80, the CPU 53 of the server 48 edits the columns of existence of the pedigree and the name of pedigree, which is the personal data, in the gene data accordingly.

And, the CPU 53 of the server 48 lets the gene data purchase screen 80 display a message "permit mixing for baby?", and the YES button 83A and NO button 83B to respond the message, and then, processes the steps SP22 to SP24 similarly to the aforementioned steps SP18 to SP20.

As a result, this gene data is newly registered in the hard disk drive 55 of the server 48, in relation with the corresponding owner's data, mixing history data, and mixing yes/no data, and concurrently the gene data is download into the memory 10A of the user's pet robot 1, with the required charge withdrawn later from the user's account at an appointed financial institution.

In this way, this network service 40 is designed such that new gene data is created by mixing gene data of two pet robots desired, which can be downloaded into the user's pet robot 1.

(1-2-4) Pedigree Issue Service

Next, explanation is given on a pedigree issue service in a network system 40. In this network system, a user who registered the aforementioned gene data described in FIG. 8, can purchase a pedigree corresponding to its functions of his pet robot 1.

In practice, a user who desires to use such a pedigree issue service connects his pet robot 1 to a personal terminal 41A to 41D and then, connects the personal terminal 41A to 41D to the server 48, in accordance with the pedigree issue procedure RT3 shown in FIG. 17 (step SP31).

Figure 18:
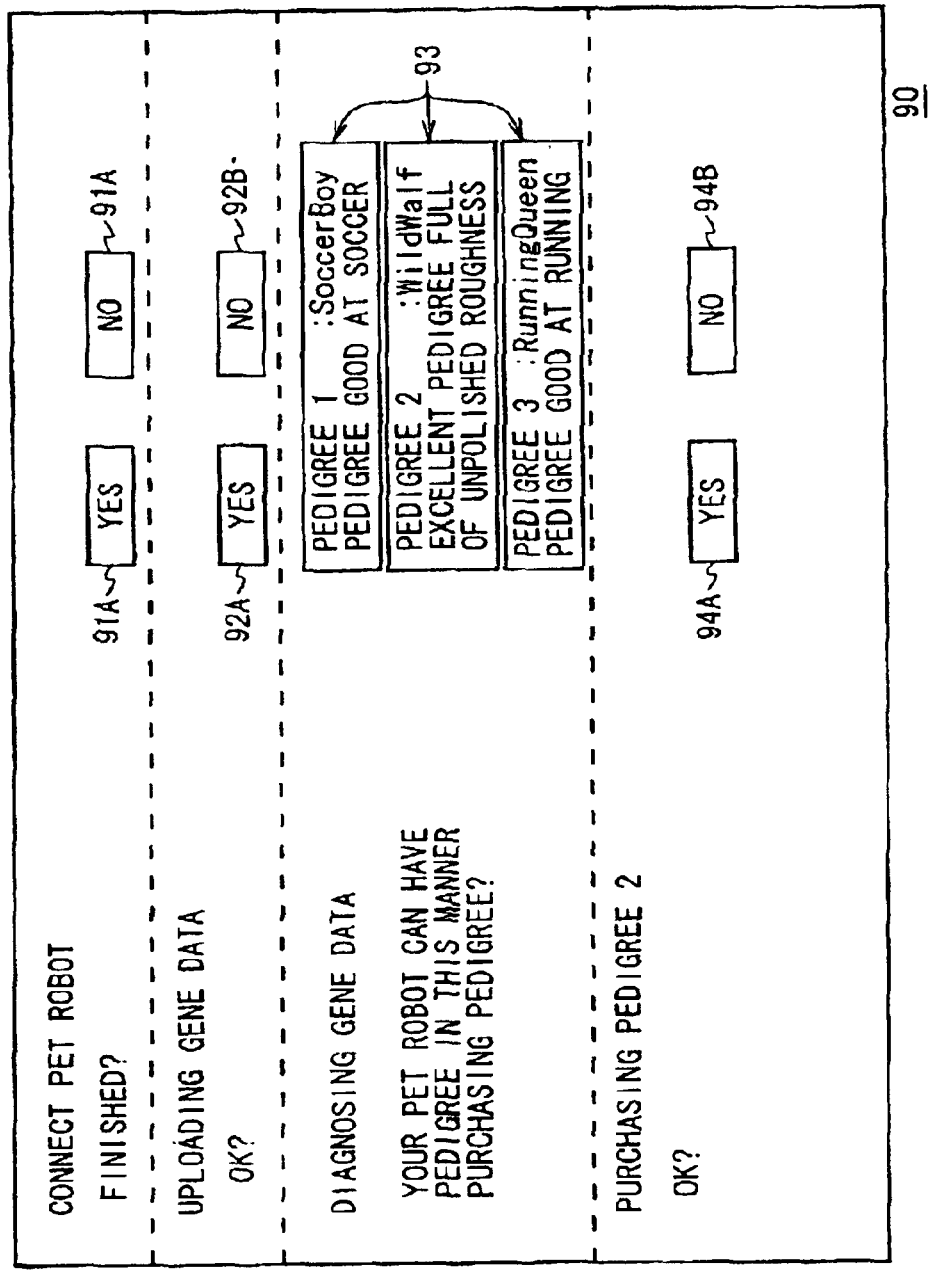
FIG. 18 is a schematic diagram showing a pedigree issue screen.

As a result, a pedigree issue screen 90 as shown in FIG. 18 appears on the display of the personal terminal 41A to 41D. In this case, only a message "Connect pet robot. Finished?", and the YES button 91A and NO button 91B to respond the message are initially displayed on the pedigree issue screen 90.

Upon the clicking of the YES button 91A in this state, a message "Upload gene data. OK?", and the YES button 92A and NO button 92B to respond the message are displayed on the pedigree issue screen 90.

Furthermore, in the pedigree issue screen 90 the clicking of the YES button 92A in this state retrieves the gene data from the memory 10A of the pet robot 1 through the personal terminal 41A to 41D, which is uploaded into the server 48 (step SP32), subsequently displaying a message "Diagnose gene data" on the pedigree issue screen 90.

At this stage the CPU 53 of the server 48 extracts the spec data from the uploaded gene data of the pet robot 1, and based on the spec data, it is judged whether conditions are satisfied for issuing any pedigree (step SP33).

In concrete, the CUP 53 judges that an "excellent pedigree in football (Soccer Boy)" may be issued, for example, when the transition probabilities $P_1$ to $P_{n+1}$ corresponding to the action "front kick" (kick by a foreleg) in some predetermined nodes $NODE_1$ to $NODE_n$, and the transition probabilities $P_1$ to $P_{n+1}$ corresponding to the action "back kick" (kick by a rear leg) in some predetermined nodes $NODE_1$ to $NODE_n$, are all higher than values pre-determined by learning, based on the data of a behavior model contained in the spec data.

Also, the CPU 53 judges that a "pedigree full of unpolished roughness (Wild Wolf)" may be issued, for example, when in some predetermined nodes $NODE_1$ to $NODE_n$, the transition probabilities $P_1$ to $P_{n+1}$ corresponding to the action of attacking another pet robot 1 when it is detected, is higher than values pre-determined by learning, based on the data of a behavior model contained in the spec data.

When the CPU 53 judges based on the judgment result that no pedigree could be issued, a comment "unable to issue any pedigree" is displayed on the pedigree issue screen 90, while a message "Your pet can have these kinds of pedigrees. Purchase one?", and information 93 showing the available pedigrees are displayed in a predetermined location on the pedigree issue screen 90 when it is judged that any pedigree may be issued (step SP34).

Therefore, a user can select the only pedigree he desires to purchase by clicking the information showing a desired pedigree 93 out of the messages of the information on the pedigrees which are displayed as "available for purchasing". At this time, displayed on the pedigree issue screen 90 are a message "Purchasing pedigree (pedigree selected by the user). OK?" and the YES button 94A and NO button 94B to respond to this message.

The user judges in this state weather to purchase a pedigree (step SP35), and clicks the NO button 94B when not purchasing a pedigree. Consequently, the processing on the pedigree issue service is terminated (step SP39).

Figure 19:
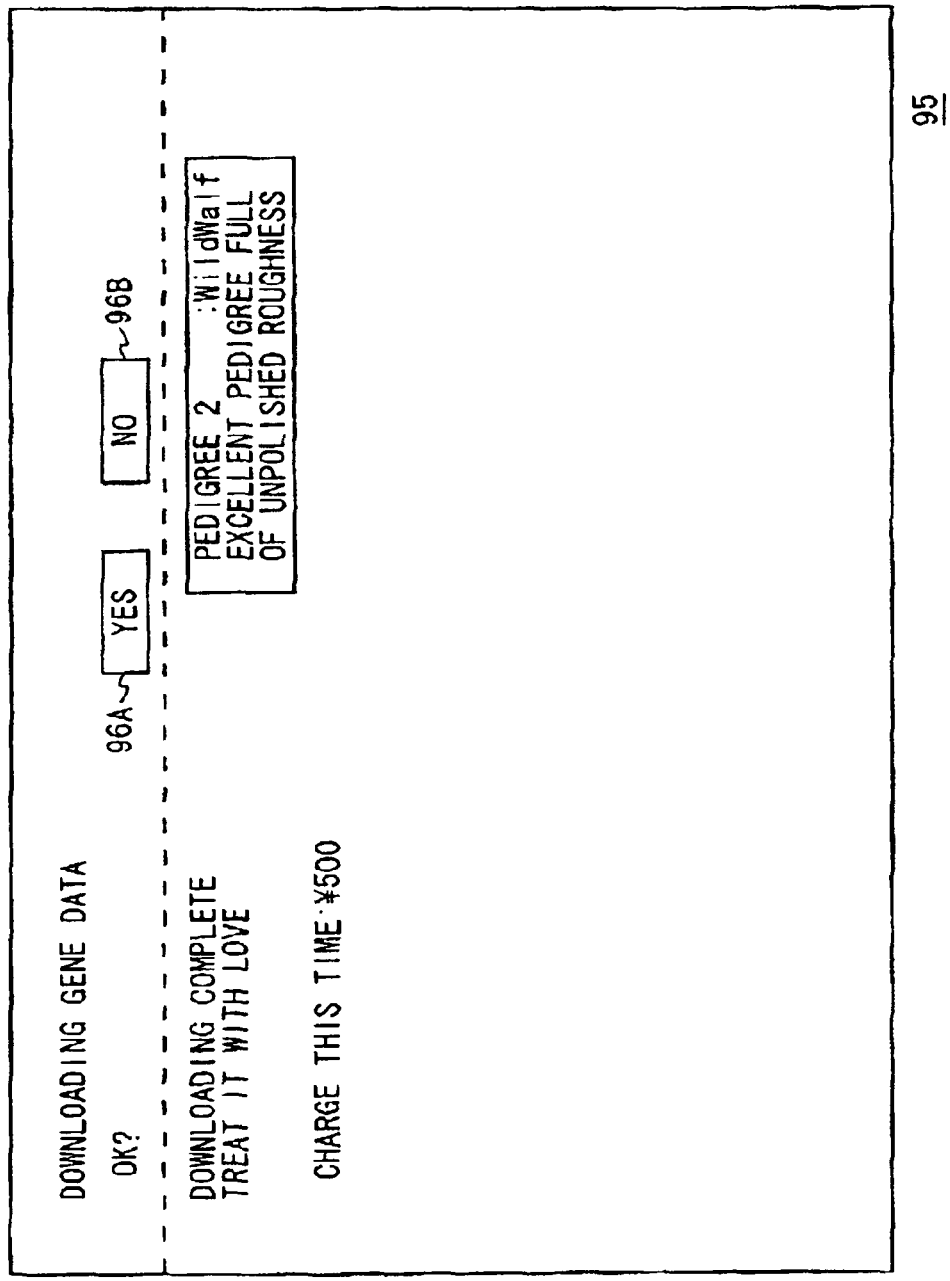
FIG. 19 is a schematic diagram showing a pedigree issue screen.

Contrarily, the YES button 94A is to be clicked when purchasing a pedigree. Then, another pedigree issue screen 95 as shown in FIG. 19 appears on the display of a personal terminal 41A to 41D in place of the current pedigree issue screen 90.

In this case, displayed on the pedigree issue screen 95 are a message "Download gene data. OK?", and a YES button 96A and NO button 96B.

Then, the CPU 53 of the server 48 terminates the processing on the pedigree issue service when the NO button 96B on this pedigree issue screen is clicked. On the other hand, when the YES button 96A is clicked, the CPU 53 of the server 48 changes the portions showing the existence and the name of a pedigree in the personal data of the gene data uploaded at the step SP32 in accordance with a pedigree the user has determined to purchase. Then, the changed new personal data is downloaded into the memory 10A of the pet robot 1 via a personal terminal 41A to 41D so as to overwrite the original personal data (step SP36).

Furthermore, when the downloading is completed, appearing on the pedigree issue screen 95 is a message "Downloading finished. Treat it with love.", information on the pedigree the user has purchased, and the charge for this pedigree issue service.

For additional information, the personal data and pedigree data in the gene data of the pet robot 1 stored on the hard disk drive 55 is changed in accordance with the pedigree the user has purchased (step SP37).

Later, the charge for the pedigree issue service displayed on the pedigree issue screen 95 is withdrawn from the user's account of his financial institution (step SP38). In this way, it is designed in a network system 40 such that a user can purchase a pedigree depending upon the characters of the pet robot 1.

(1-2-5) Emblem Issue Service

Next, explanation is given on an emblem issue service in the network system 40. In this network system 40, a user who registered the aforementioned gene data as shown in FIG. 8, can purchase an emblem for his pet robot 1 in accordance with its function.

In practice, a user wishing to have such an emblem issue service is to connect his pet robot 1 to a personal terminal 41A to 41D (step SP41), which is in turn connected to the server 48.

Figure 21:
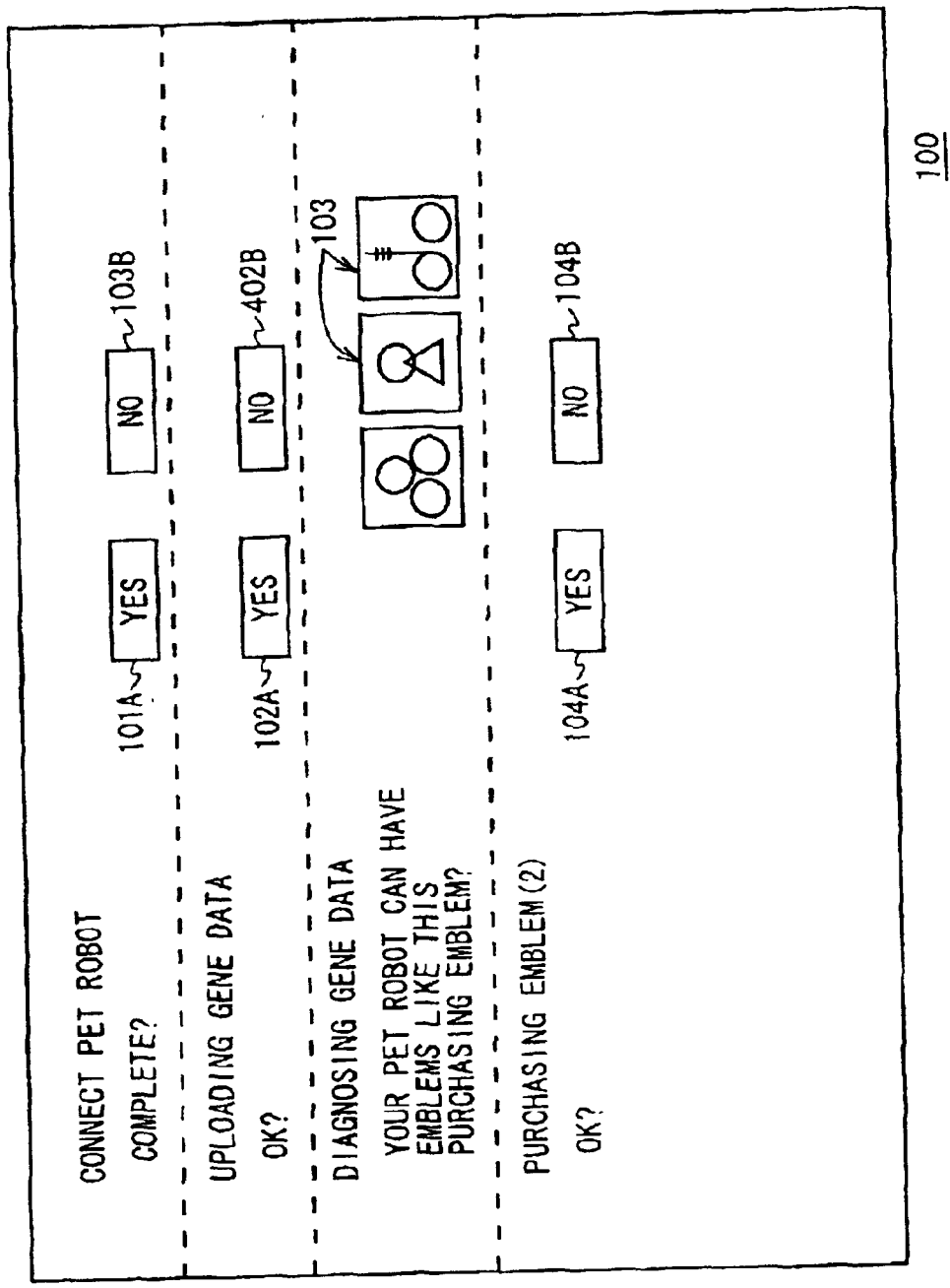
FIG. 21 is a schematic diagram showing an emblem issue screen.

Consequently, an emblem issue screen 100 as shown in FIG. 21 appears on the display of the personal terminal 41A to 41D. In this case, display on the emblem issue screen 100 are a message "Connect pet robot. Complete?" and the YES button 101A and NO button 101B to respond this message.

And, the click of the YES button 101A in this state brings on the emblem issue screen 100 a message "Upload gene data. OK?." and the YES button 102A and NO button 102B to respond this message.

Then, the click of the YES button 102A by the user uploads the gene data into the server 48 from the memory 10A of the pet robot 1 through the personal terminal 41A to 41D (step SP42). Also displayed on the emblem issue screen 100 is a message "Diagnosing gene data".

At this time, the CPU 53 of the server 48 extracts spec data out of the uploaded gene data of the pet robot 1, and judges based on the spec data whether conditions are satisfied to issue any pedigree, in a similar manner as done in the preceding pedigree issue service (step SP43).

When it is judged based on the above judgment result that any pedigree can not be issued, the CPU 53 lets the emblem issue screen 100 display a comment of "Unable to issue emblem", while when it is judged that any pedigree may be issued, an emblem is created with a figure permitted for that pedigree.

That is to say, in this embodiment, the figures (○, Δ, □, etc.) and their numbers which are usable in emblems are predetermined for each pedigree. And, upon confirming pedigrees which can be issued in the above manner, the CPU 53 creates an emblem in such a way as to determine the center position of each figure at random using as many figures as usable for the emblems of the corresponding pedigrees.

Furthermore, subsequently the CPU 53 judges whether the emblem thus created is identical to the emblems issued for other pet robots 1 registered in advance on the hard disk drive 55, and when the same emblem as those created at this time has been registered, the emblem is created again in a similar way to the above.

In the meantime, when the same emblem has not been registered, the CPU 53 lets the emblem issue screen display a message "Your pet can have these emblems. Purchasing one?" and the emblems 103 of the pedigree created in the above manner (step SP44).

When one emblem is selected from among those emblems 103 displayed, the CPU 53 lets the emblem issue screen 100 display a message "Purchase emblem (the number of the emblem selected). OK?" and a YES button 104A and NO button 104B to respond this message.

Then, the user judges whether to purchase a selected emblem in this state (step SP45) and clicks the NO button 104B when not purchasing. Consequently the processing on this emblem issue service is terminated (step SP49).

Figure 22:
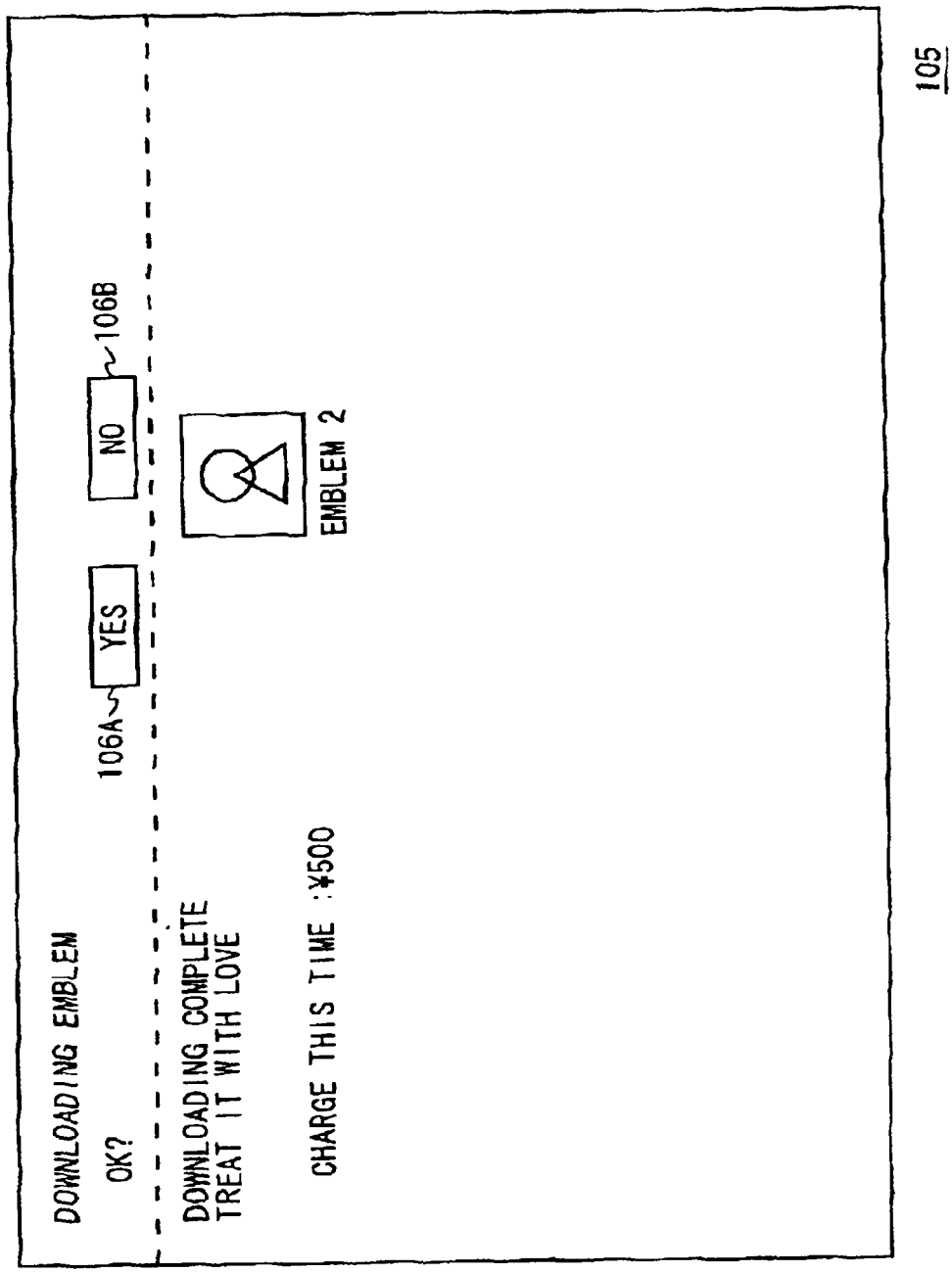
FIG. 22 is a schematic diagram showing an emblem issue screen.

Meantime, when an emblem is to be purchased, the YES button 104A is clicked. As a result, an emblem issue screen 105 as shown in FIG. 22 appears on the display of the personal terminal 41A to 41D in place of the emblem issue screen 100.

Initially, displayed on this emblem issue screen 105 are a message "Download emblem. OK?" and a YES button 106A and NO button 106B.

The user is to click the NO button 106B when not downloading the data of this emblem. The processing on this emblem issue service terminates at this moment.

Whereas, when the data of this emblem may be downloaded, the YES button 106A is to be clicked. At this moment, the CPU 53 of the server 48 stores an emblem selected by the user in the portion of the emblem data in the personal data of the gene data uploaded at the step SP42. At the same time, the new personal data thus changed is downloaded into the memory 10A through the personal terminal 41A to 41D in such a manner as to overwrite the original personal data stored in the memory 10A of the pet robot 1 (step SP46).

In addition, when this downloading is finished, displayed on the emblem issue screen 105 are a message "downloading terminated. Treat it with love", the emblem selected by the user, and a charge for this emblem issue service.

Subsequently, in the server 48, the personal data and pedigree data of the gene data of the pet robot 1 stored on hard disk drive 55 are changed in accordance with the pedigree purchased by the user, under the control of the CPU 53. At the same time, the data of the emblem purchased by the user is stored on the hard disk drive 55 in the form of database, along with the data of other emblems registered in advance (step SP47).

Later, the charge for the pedigree issue service displayed on the pedigree issue screen 105 is withdrawn from the user's account of his financial institution (step SP48). In this manner the user can purchase an emblem in accordance with the function of his pet robot 1 in the network system 40.

(1-2-6) Pedigree Inquiry Service

Explanation is given on a pedigree inquiry service in the network system 40. In the network system 40, a user who registered the gene data described in FIG. 8, can inquire into the pedigree of his pet robot 1.

In practice, a user wishing to utilize such a pedigree inquiry service, contacts his pet robot 1 to the server 48 through the personal terminal 41A to 41D in accordance with a pedigree inquiry procedure shown in FIG. 23 (step SP51)

Figure 24:
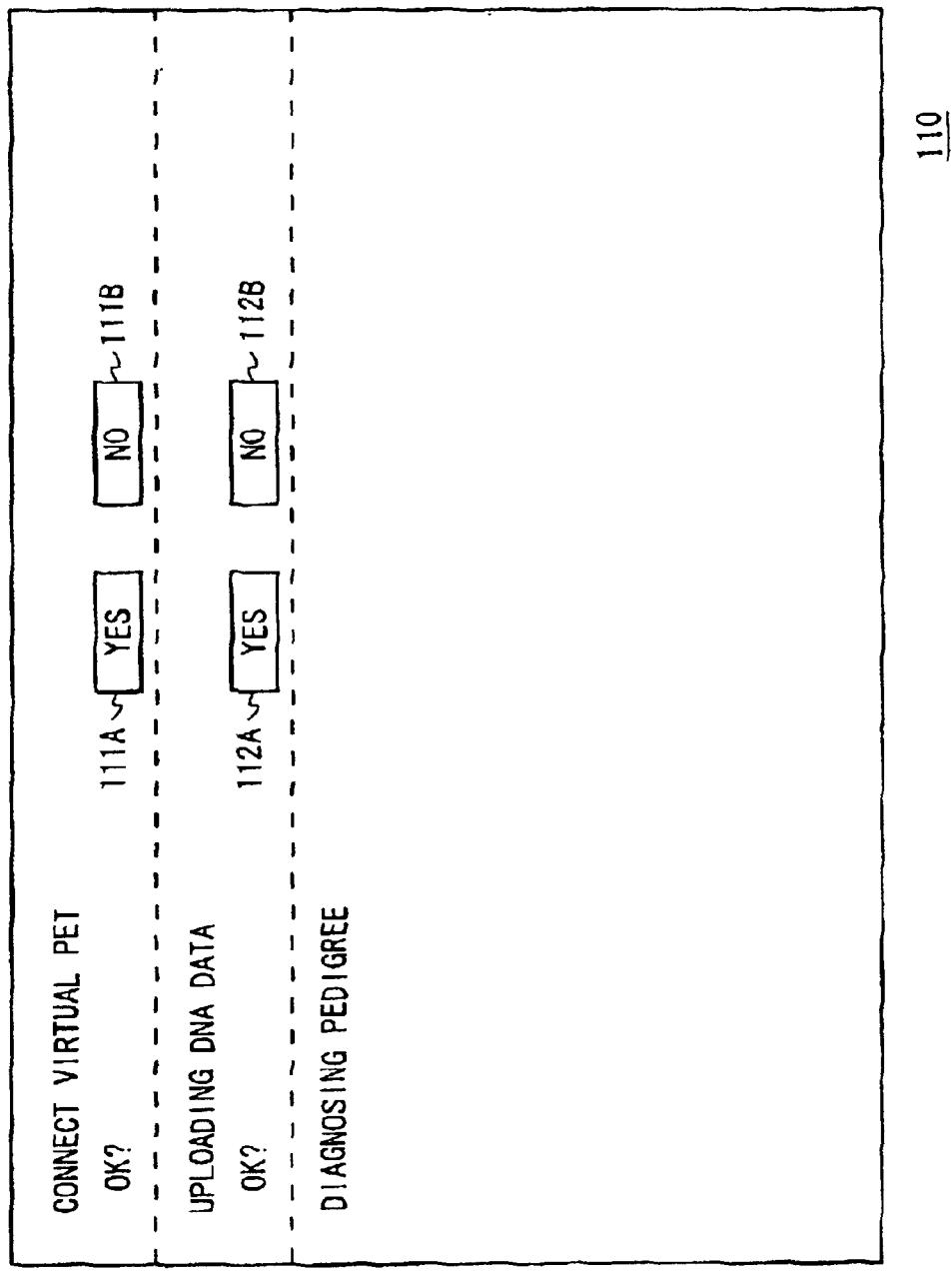
FIG. 24 is a schematic diagram showing a pedigree inquiry screen.

A pedigree inquiry screen 110 as shown in FIG. 24 appears on the display of the personal terminal 41A to 41D at this moment. In this case, initially displayed on this pedigree inquiry screen 110 are a message "Connect pet robot. Complete?" and the YES button 111A and NO button 111B to respond this message.

The click of the YES button 111A in this state brings a message "Upload gene data. OK?" and the YES button 112A and NO button 112B to respond this message.

And, when the user clicks the YES button 112A, the gene data is retrieved from the memory 10A of the pet robot 1 through the personal terminal 41A to 41D, under the control of the CPU 53 of the server 48, which is uploaded into the server 48, with a message "Diagnose gene data" displayed on the pedigree inquiry screen 110 (step SP52).

At this moment, the CPU 53 of the server 48 analyzes the personal data of the uploaded gene data of the pet robot 1 and extracts the serial number of the pet robot 1 contained in the personal data.

Figure 25:
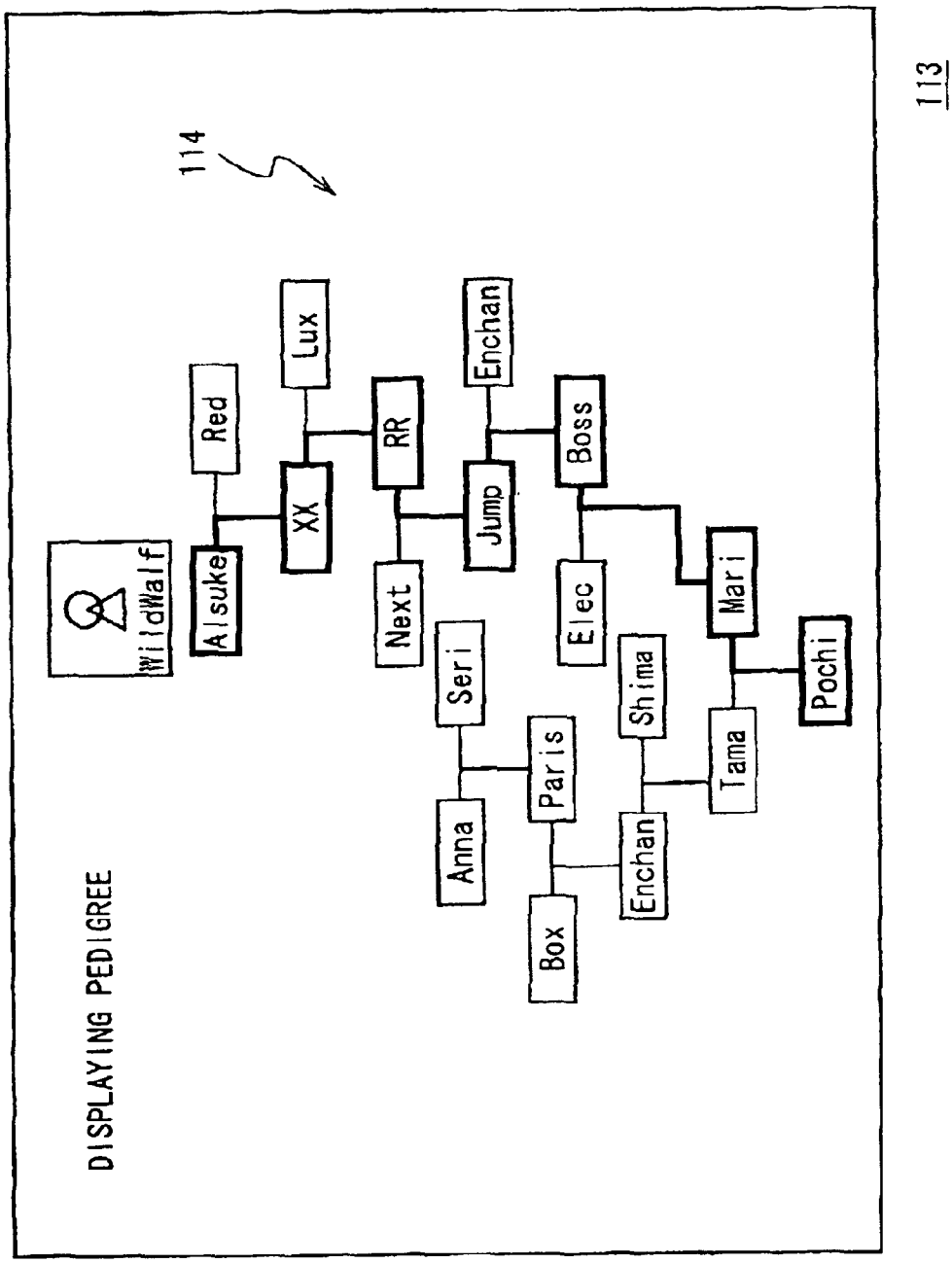
FIG. 25 is a schematic diagram showing an inquiry result display screen.

Furthermore, the CPU 53 retrieves the pedigree of the pet robot 1, sequentially tracing back to the past generations (step SP54), based on this extracted serial number and the database of the pedigree data stored on the hard disk drive 55, and the resultant is displayed in the form of a family tree shown in FIG. 25, on the display of the personal terminal 41A to 41D (step SP5).

As to an inquiry result display screen 113 shown in FIG. 25, the click of a desired name out of the names of parents of a pet robot 1 of each generation shown in the form of a family tree can have the detailed information of the pet robot 1 (name of the owner, and images of pet robots, etc.) displayed on the inquiry result display screen 113.

Then, the CPU 53 transmits the family data consists of the family tree and the detailed information on the pet robots 1 for each generation, to the personal terminal 41A to 41D, for downloading, and later, a predetermined charge are withdrawn from a user's account of his financial institution (step SP56).

In this way, the network system 40 is designed such that a user can inquire into the pedigree of his own pet robot 1.

(1-3) Operations and Effects of this Embodiment

In this network system 40 structured as described above, when the pedigree issue service is asked for, the gene data of the pet robot 1 of a user is uploaded into the server 48, to judge whether any pedigree could be issued based on this gene data.

And, when an affirmative result is obtained, pedigrees which can be issued appear on the display of the personal terminal 41A to 41D, and when the user selects a desired pedigree out of them, the gene data changed responding to it, is downloaded into the pet robot 1, with the corresponding pedigree registered into the server 48.

Also, in this network system, when the emblem issue service is asked for, the gene data of the pet robot 1 of the user is uploaded into the server 48, and based on this gene data, the server 48 judges whether any pedigree can be issued.

Then, when an affirmative result is obtained, emblems suitable for each of pedigrees the server 48, which can be issued, are created, which appear on the display of the personal terminal 41A to 41D. Furthermore, when the user selects a desired emblem out of them, the gene data changed depending on it, and is downloaded into the pet robot 1, with the corresponding emblem registered into the server 48.

On the other hand, when a pedigree inquiry service is asked for in this network system 40, the gene data of the pet robot 1 of a user is uploaded into the server 48, and based on this gene data a pedigree is retrieved.

And, the result of inquiry into the pedigree appears on the display of the personal terminal 41A to 41D, with the result of inquiry downloaded into the personal terminal 41A to 41D.

Accordingly, in this network system 40, it is possible to provide a pet robot 1 with a value added, other than functionality including a pedigree and an emblem, thereby increasing the fun in a pet robot 1 significantly.

In addition, in the network system 40, when the user selects two gene data out of gene data registered in the server 48, new gene data is created based on these gene data and is downloaded in the pet robot 1.

Therefore, in this network system 40, the user can bring the characters of two pet robot selected by him, as new gene data into his pet robot, as if the characteristics of an actual living thing were handed down to subsequent generations due to inheritance, so that the fun in the pet robot 1 is increased.

Constructed as described hitherto, with the introduction of the concept of pedigree into a pet robot 1, it is possible to bestow value added, other than functionality, upon the pet robot 1, thus significantly enhancing the entertainment in a pet robot.

Further, in the above configuration, new gene data is created based on two gene data which the user selected out of gene data registered in the server 48, which enhances the fun in the pet robot, thus making it possible to significantly improve the entertainment in the pet robot 1.

(1-4) Other Embodiment

Note that, the foregoing first embodiment has described the case where the present invention is applied to the network system 40 and server 48 to carry out service such as a pedigree issue service for a pet robot 1 constructed as shown in FIG. 1. However, the present invention is not limited to it, but may be applied widely to robots in other shapes, and furthermore to a variety of other information processing systems and information processing devices to provide such service as a pedigree issue service of virtual creatures.

Also, the foregoing first embodiment has described the case where gene data consists of three kinds of data, namely, personal data, pedigree data, and spec data. However, the present invention is not limited to it, the gene data may be only spec data. In short, a wide variety of other structures may be applied as the structure of gene data (inheritance data), provided that such data contains at least data to regulate the shape (in the case of displaying a virtual creature as a character, the shape of the character) and/or behaviors of the virtual creature.

Under this situation, in the case where the present invention is applied for a virtual creature which is displayed as a character on a display of a personal computer or a portable terminal device, data showing its shape can be used as a component of the inheritance data.

Furthermore, the foregoing first embodiment has described the case where a pedigree and an emblem are applied as value added to be bestowed on a pet robot 1 when the gene data of the pet robot 1 satisfies given conditions. However, the present invention is not limited to it, but other items such as classes, peerage, orders, and prizes, may be applied as value added.

Furthermore, the foregoing first embodiment has described the case where a single server 48 functions as a diagnostic means for diagnosing the gene data of a pet robot 1, a bestowing means for bestowing a pedigree and an emblem with given conditions based on the corresponding diagnostic result, an acquisition means for obtaining gene data over a network, and an inquiring means for inquiring into the type of a virtual creature. However, the present invention is not limited to it, but these means may be provided separately.

Furthermore, the foregoing first embodiment has described the case where the server 48 obtains the gene data of a pet robot 1 over the Internet 46 or through a general public line 49. However, the present invention is not limited to it, but the gene data may be obtained with other means than the above, for example, via a network such as LAN (Local Area Network), or the gene data may be obtained, recorded on a recording medium, by mail.

Furthermore, the foregoing first embodiment has described the case where a hard disk drive 55 functions as a storage means in the server 48 for storing the gene data of a pet robot 1 and the information on parents (pedigree data). However, the present invention is not limited to it, but the storage means may be constructed by a disk recording medium other than a hard disk drive and its driver, a memory and its driver, a tape recording medium and its driver, et al.

Furthermore, the foregoing first embodiment has described the case where the mixing processing of gene data is performed as described in FIG. 14. However, the present invention is not limited to it, but a wide variety of other methods may be applied.

Furthermore, the foregoing first embodiment has described the case where the inquiry result of inquiring into the pedigree of a pet robot 1 is indicated only as a family tree. However, the present invention is not limited to it, but the server 48 may be designed so as to issue a certificate to certify the pedigree of a pet robot based on the inquiry result of pedigree inquiry.

Furthermore, the foregoing first embodiment has described the case where the present invention is applied to the pet robot 1 which walk with four legs, as shown in FIG. 1, and the network system 40 constructed as shown in FIG. 6. The present invention, however, is not limited to this and may be widely applied to entertainment robots having other constructions, data storage devices, such as a personal computer, which can store data of virtual creatures, and information processing devices having various constructions.

Furthermore, the foregoing first embodiment has described the case where only users who made the registration described in FIG. 8 can utilize the service described in FIG. 9. The present invention, however, is not limited thereto and users who do not make such a registration may utilize such service.

Furthermore, the foregoing first embodiment has described the case where new gene data is created based on two pieces of gene data. However, the present invention is not limited thereto and new gene data may be created based on only one piece of gene data, or more than two pieces of gene data.

Furthermore, the foregoing first embodiment has described the case where a single server 48 functions as an inheritance data creation means for creating new inheritance data based on two pieces of inheritance data (gene data), a providing means for providing the newly created inheritance data, and an inheritance data obtaining means for obtaining the inheritance data over a network. The present invention, however, is not limited to this and these means can be provided separately.

Furthermore, the foregoing first embodiment has described the case of downloading the new gene data so as to rewriting the original gene data in the memory 10A of the pet robot 1. However, the present invention is not limited to this and for example, the pet robot 1 may be constructed with gene data of the pet robot 1 stored in an external storage medium such as a memory card, and new gene data may be downloaded in the same type of external storage medium. As a result, the original gene data is prevented from being erased due to the downloading of the new gene data.

Furthermore, in this case, the foregoing first embodiment has described the case where the new gene data is provided to users over the Internet 46 or through the general public circuit 49. The present invention, however, is not limited to this and for example, the new gene data may be store in a recording medium and sent by mail, or be handed over to users at convenient stores or shops of the marketing company 47.

Furthermore, the foregoing first embodiment has described the case where the hard disk drive 55 is applied as a storage means for storing and holding gene data registered in the server. The present invention, however, is not limited to this and other various storage means such as a disc recording medium, a semiconductor memory or a tape recording medium may be applied.

Furthermore, the foregoing first embodiment has descried the case where new created gene data is on sale. The present invention, however, is not limited to this and the data may be provided to users for free.

(2) Second Embodiment (2-1) Outline of Pet Robot in this Embodiment

Figure 26:
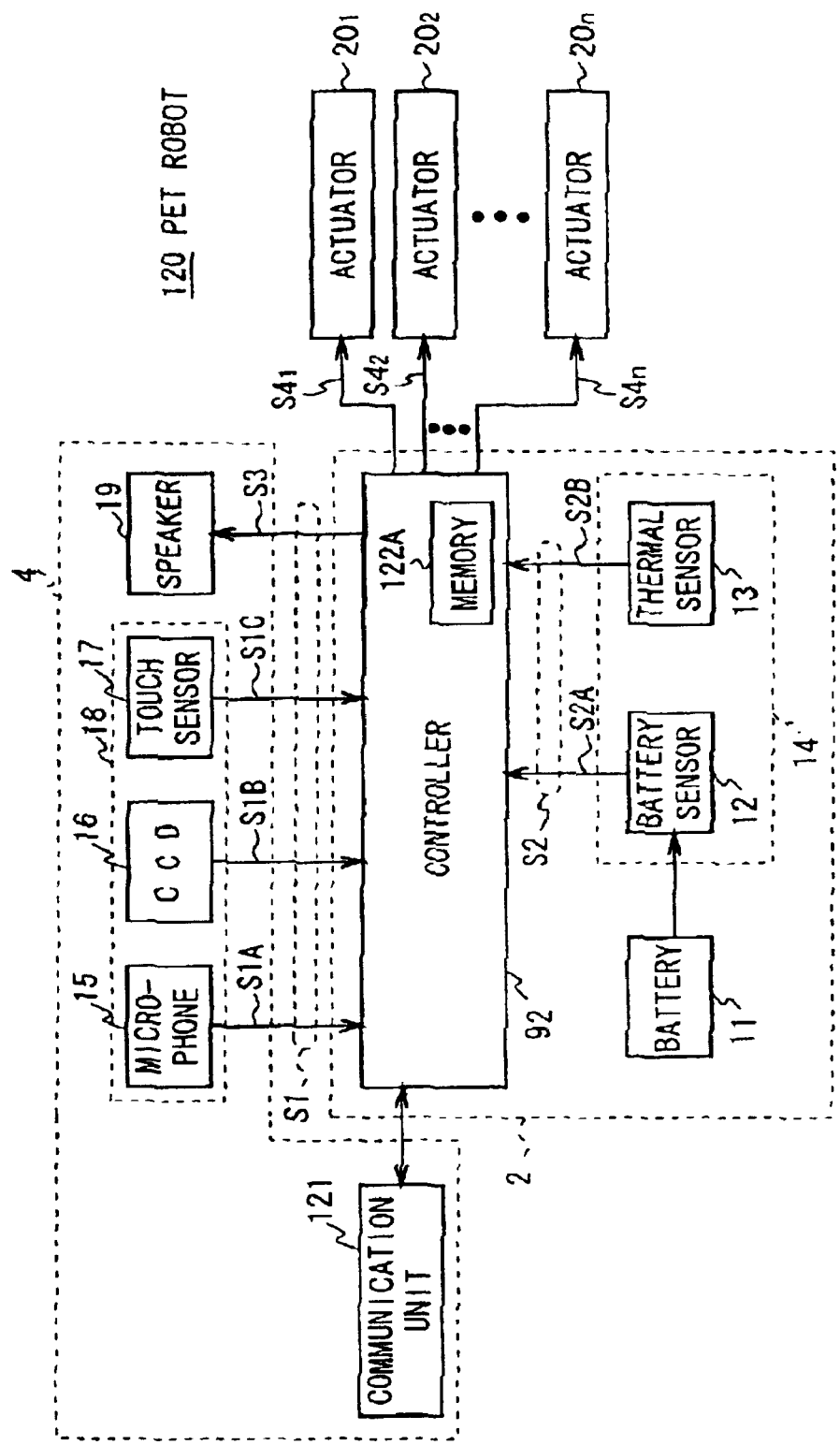
FIG. 26 is a block diagram showing the internal structure of a pet robot in the second mode of embodiment.

FIG. 26 shows a pet robot 120 in the second embodiment, with the same reference numerals as those assigned to the corresponding parts in the FIG. 2, which is almost similarly structured to the pet robot 1 in the first embodiment, except that the pet robot 120 incorporates a communication unit 91 to conduct wireless communication with other pet robots 120 by means of infrared communication, wireless LAN (Local Area Network), mobile telephone line, or sound scale recognition, etc., and that the pet robot 120 is designed to be capable of transmitting/receiving gene data to/from other pet robots 120 with the use of the communication unit 91.

Figure 27:
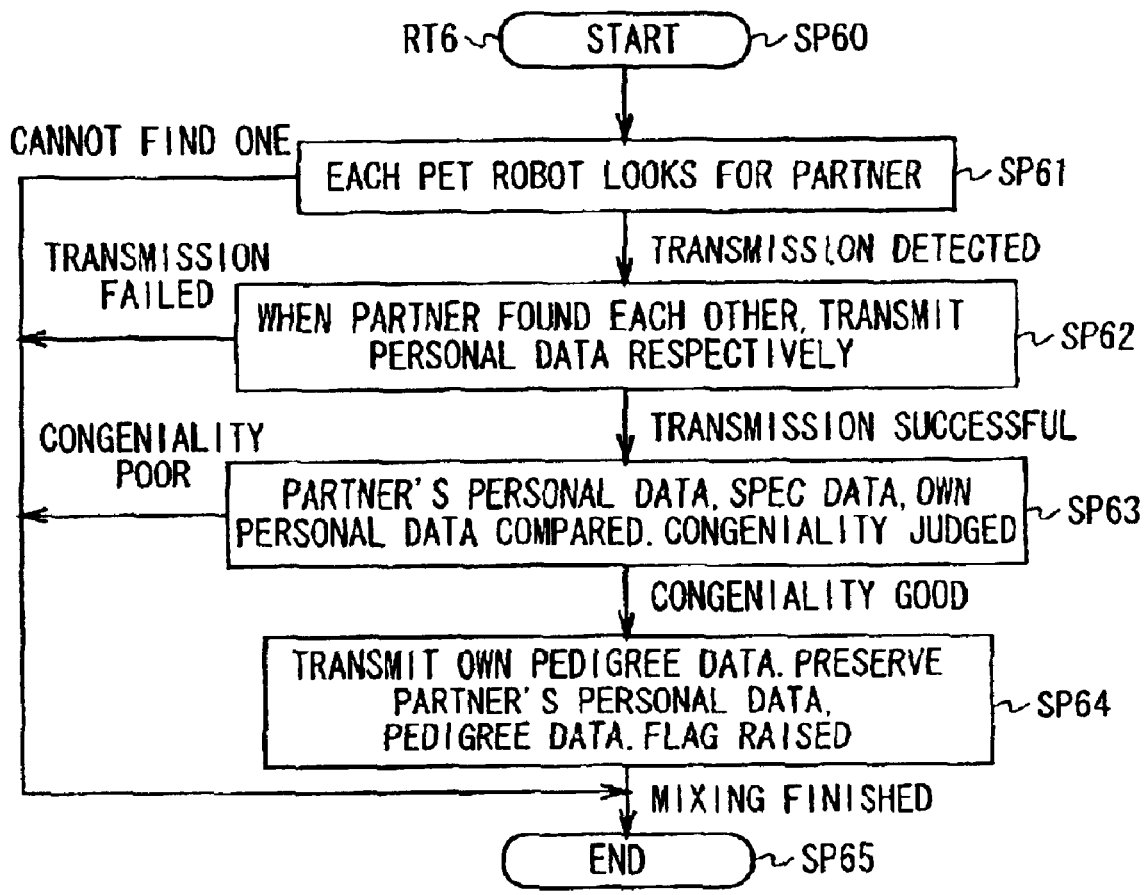
FIG. 27 is a flowchart showing a mixing mode processing procedure.

That is to say, the pet robot 120 is provided with a mixing mode, and when the mixing mode is set by a user, this pet robot 120 is capable of being mixed with another pet robot 120 (transmitting/receiving gene data) in accordance with a mixing processing procedure RT3 shown in FIG. 27.

In practice, when the mixing mode is set by a user, the controller 122 (FIG. 26) of the pet robot 120 starts this mixing processing procedure RT3 (step SP60), to look for a mixing partner, another pet robot 120, by performing retrieval based on an image signal S1B and others supplied from a CCD camera 16 for example, in accordance with the control program stored in a memory 122A (step SP 61).

Then, the controller 122 terminates the mixing mode if the mixing partner, that is, another pet robot 120 has not been detected within a given period of time (step SP65). On the other hand, when the pet robot detects the mixing partner, that is, another pet robot 120 within a given period of time, the pet robot 1 transmits its own gene data to the detected pet robot 120 via the communication unit 121 (step SP62).

Furthermore, however, when the gene data of the detected pet robot 120 has not been received within a given period of time, the controller 122 terminates the mixing mode (step SP65). On the other hand, when the gene data of the detected pet robot 120 is received, the controller 122 judges the congeniality by comparing the received gene data and its own gene data (step SP63).

The controller 122 terminates the mixing mode (step SP65), judging that the congeniality is not good in such a case where, for example, the differences are too big in function between the counterpart pet robot 120 and its own pet robot 120 (the values of differences in the figures of motion data and sound data in the spec data are higher than the preset threshold values, for example), or where the only one pet robot 120 has a pedigree.

In the meantime, when the counterpart pet robot 120 and its own pet robot 120 are similar to each other in function, or when both the pet robots 90 do or do not have a pedigree, the controller 122, judging that the congeniality is good, saves the gene data of the counterpart pet robot 120 in its own memory 122A, and then terminates the mixing mode with positioning a mixing flag indicating the termination of mixing (step SP65).

As described above, this pet robot 120 is so designed as to obtain and save the gene data of a congenial counterpart pet robot 120 by means of artificial mixing processes.

(2-2) Structure of Network System 130 in the Second Embodiment

Figure 28:
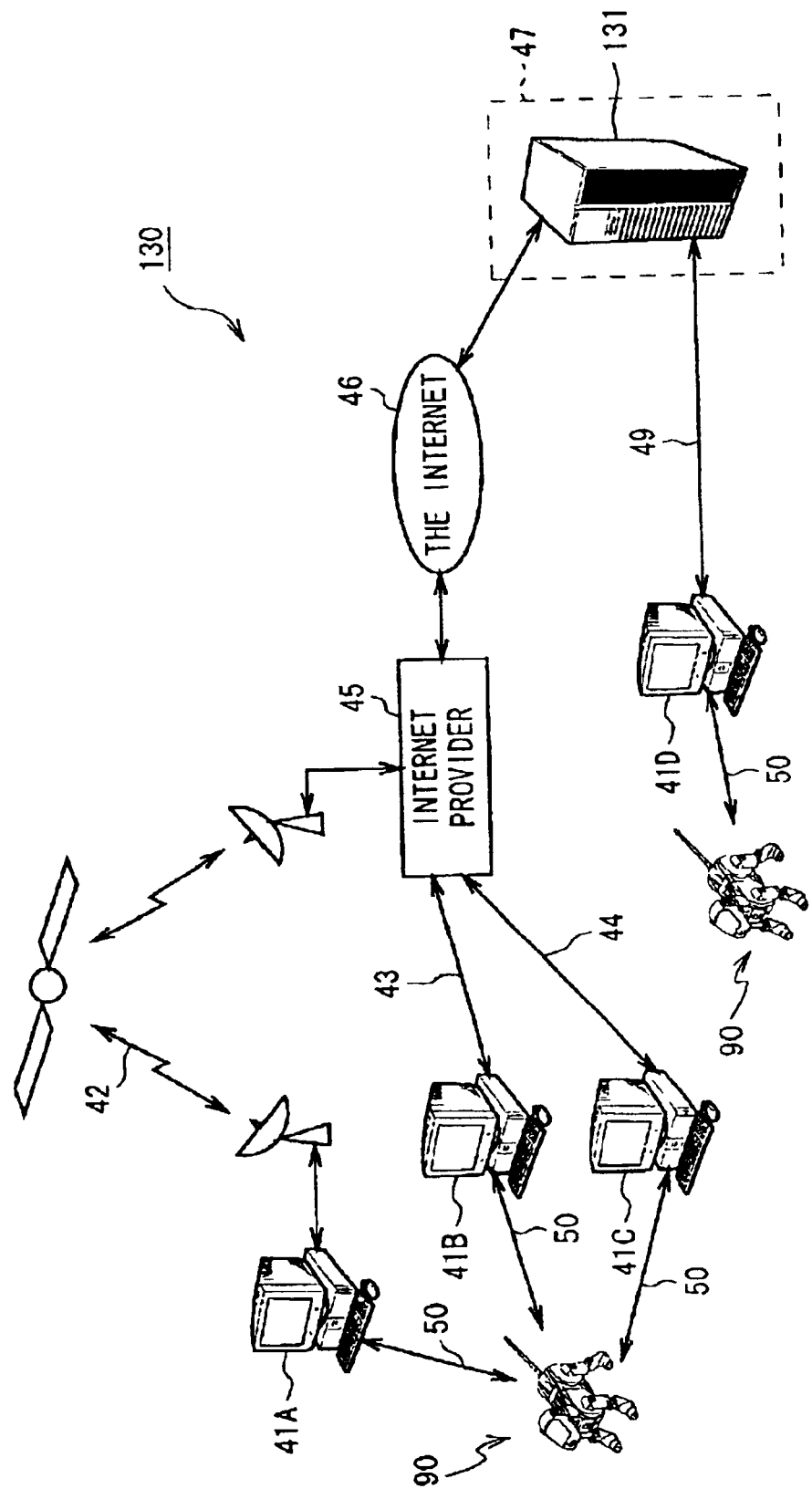
FIG. 28 is a block diagram showing a network system in the second mode of embodiment.

Meanwhile, the FIG. 28 shows a network system 130 in the second embodiment, with the same reference numerals as those assigned to the corresponding parts in the FIG. 6, which is structured similarly to the network system 40 (FIG. 6) in the first embodiment, except that the functions installed in the server 131 differ.

That is, in the network system 130, the server 131 is installed with a function to create new gene data based on the gene data of the pet robot 120 having mixed with another pet robot 120 mentioned in FIG. 27 and the gene data of the counterpart pet robot 120, in addition to those functions installed in the server 48 in the network system 40 in the first embodiment.

In practice, a user mentioned in FIG. 8 can utilize such service in the network system 130. And, a user wishing to utilize such service is firstly to connect a pet robot 120 having mixed with another pet robot 120 to the server 131 via a personal terminal 41A to 41D, in accordance with the second gene data purchase processing procedure RT2 shown in FIG. 29.

Then, the user uploads into the server 131 the gene data of the pet robot 120 and the gene data of the counterpart pet robot 120, each of which is stored in the memory 122A of the pet robot 120, with the use of the screen appearing on the display of the personal terminal 41A to 41D.

In this network system, then, new gene data is created based on those two pieces of gene data by performing the steps SP73 to SP83 similar to the steps SP14 to SP24 in the first gene data purchase processing procedure RT2 shown in FIG. 9, and is downloaded into the pet robot 120.

(2-3) Operations and Effects of this Embodiment

Structured as described hitherto, in a robotic system consisting of pet robots 120 and a network system 130, a pet robot 120 looks for a counterpart pet robot 120 for mixing autonomously, and conducts mixing by obtaining the gene data of the counterpart pet robot 120 by means of communication.

Then, the user of this pet robot 120 is to create new gene data based on the gene data of the pet robot 120 itself and the gene data of the counterpart pet robot 120 and downloads it into the pet robot 120, utilizing the network system 130.

According to such a robotic system, since it is possible to obtain new gene data customized using the gene data by mixing the owner's pet robot 120 with another pet robot 120 as if actual living things were mixed, thereby increasing the fun in the pet robot 120 significantly.

Structured as described above, the pet robot 120 looks for another pet robot 120 for mixing autonomously and mixes with it by obtaining the gene data of the counterpart pet robot 120 by means of communication, and new gene data can be created based on the gene data of the two pet robots 90 obtained by means of mixing, thereby increasing the fun in a pet robot 120 significantly, compared to the first embodiment, resulting in the further enhancement of the entertainment in a pet robot.

(2-4) Other Embodiment

The foregoing second embodiment has described the case where the present invention is applied to four-legged walking type of pet robots 120 structured as in FIG. 1 and FIG. 26, and to the network systems 130 structured as shown in FIGS. 28. However, the present invention is not limited to the above, but may be widely applied to other various entertainment robots, data storing means such as a personal computer for storing data of virtual creatures, and information processing devices in various modes.

Figure 29:
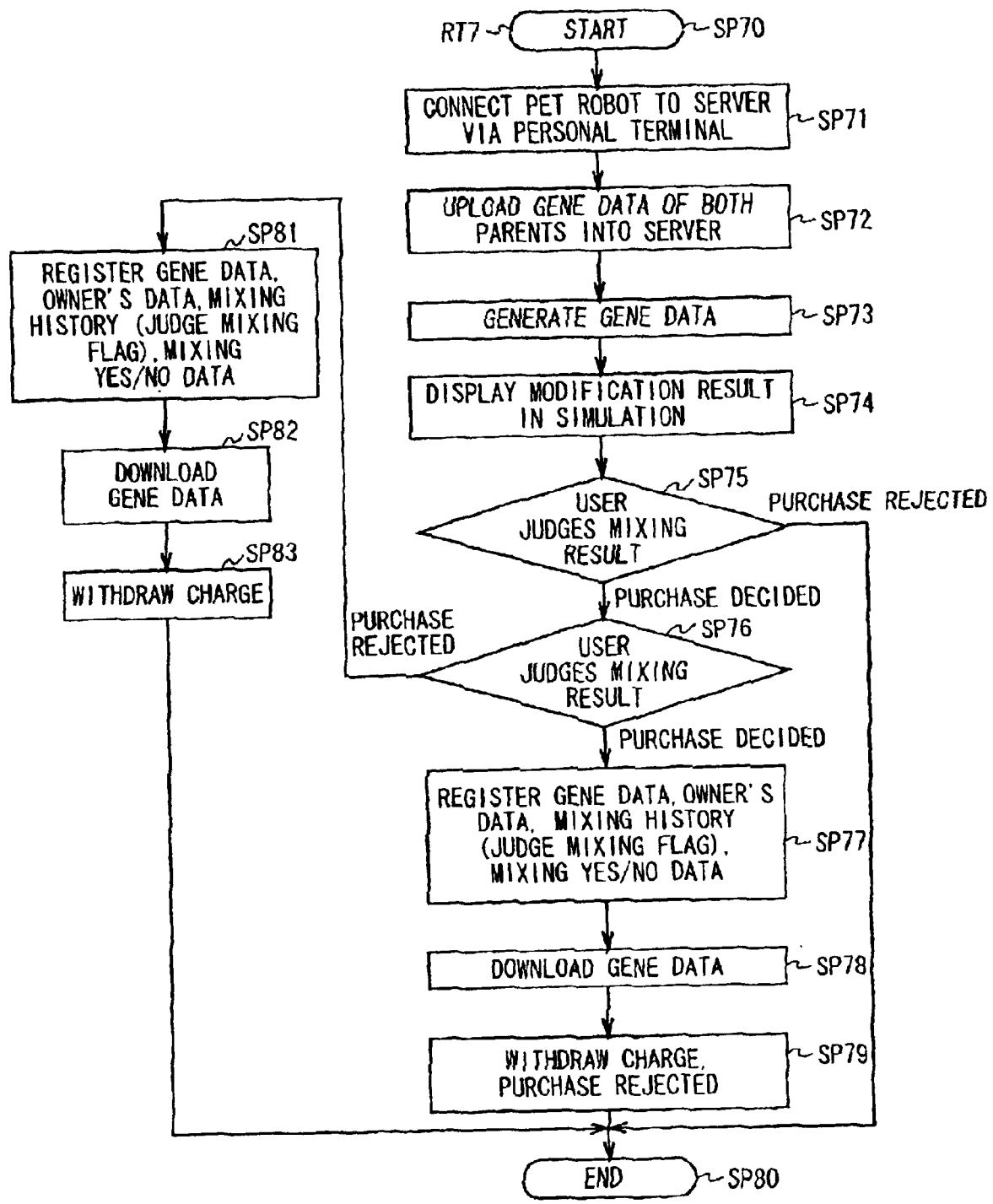
FIG. 29 is a flowchart showing a second gene data purchase procedure.

Also, the foregoing second embodiment has described the case where the only users who made a registration as described in FIG. 8, can utilize such service as mentioned in FIG. 29. However, the present invention is not limited to it, but users who do not make the registration, too, may be allowed to utilize such services.

Furthermore, the foregoing second embodiment described the case where gene data as inheritance data consists of three kinds of data: personal data, pedigree data, and spec data. However, the present invention is not limited to the above, gene data may be produced of spec data only. In short, gene data (inheritance data) may have a variety of other structures as long as they are data capable of regulating the behaviors of a pet robot 120.

In this case, when the present invention is applied to virtual creatures displayed as characters on the display of a personal computer or a mobile terminal device for example, data to regulate their shapes, too, may be defined as a makeup element of inheritance data.

Furthermore, the foregoing second embodiment has described the case where new gene data is created based on two pieces of gene data for example. However, the present invention is not limited to the above, but new gene data may be created based on the only one piece or more than two pieces of gene data.

Furthermore, the foregoing second embodiment has described the case where a single server 131 functions as an inheritance data creation means for creating new inheritance data based on two piece of inheritance data (gene data), a providing means for providing the newly-created inheritance data, and an inheritance data obtaining means for obtaining inheritance data over a network. However, the present invention is not limited to it, these means may be provided separately.

Also, the foregoing second embodiment has described the case where the server 131 obtains gene data over the Internet 46. However, the present invention is not limited to it, but gene data may be obtained via other types of network such as LAN (Local Area Network) for example, or gene data may be obtained by means of a recording medium with gene data recorded thereon, by mail or by a home delivery service company.

Furthermore, the foregoing second embodiment has described the case where new gene data is downloaded in the memory 122A of a pert robot 120 so as to overwrite the original gene data. However, the present invention is not limited to it, but the pet robot 1 may be designed such that the gene data of the pet robot 1 is stored in an external storage medium such as a memory card, and new gene data may be downloaded into the same kind of external storage medium. Such structure may protect the original gene data from being vanished due to the downloading of new gene data.

Also, in this case, the foregoing second embodiment has described the case where new gene data is offered to users over the Internet 46 or through the general public line 49. However, the present invention is not limited to it, but new gene data may be stored on a recording medium and mailed, or handed over at a convenience store or at a shop run by the marketing company 47.

Furthermore, the foregoing second embodiment has described the case where the hard disk drive 55 is applied as a storage means for storing gene data registered in the server 48. However, the present invention is not limited to it, but a wide variety of other storage means may be applied, including disk recording media other than hard disk drives, semiconductor memories, and tape recording media.

Furthermore, the second embodiment has described the case where the single memory 122A in the pet robot 120 functions as a first storage means for storing its own gene data and a second storage means for storing the gene data of another pet robot 90 obtained via the communication unit 121. However, the present invention is not limited to it, but these means may be provided separately.

Furthermore, the foregoing second embodiment has described the case where the pet robot 120 obtains the gene data of another pet robot 120 by wireless communication with the use of the communication unit 121. However, the present invention is not limited to it, but the gene data of another pet robot 90 may be obtained by wireless by means of the USB (Universal Serial Bus), IEEE1394, serial or parallel wire communication. Or, a pet robot 120 may be provided with a connecting means such as connectors to directly and electrically connect to a pet robots 120, and gene data may be transmitted or received via the connecting means.

Furthermore, the foregoing second embodiment has described the case where newly created gene data is marketed. However, the present invention is not limited to it, but it may be provided free of charge.

Industrial Applicability

The present invention can be applied to pet robots, other entertainment robots, servers connected to a network, and so on.

What is claimed is:

1. An information processing device, comprising
   an inheritance data creation means for creating a new second inheritance data which
   regulates the shape and/or behaviors, of a virtual creature that can be expressed as data and is designed to be programmed to perform actions by the virtual creature, based on a first inheritance data which regulates the shape and/or behaviors of said virtual creature; and
   providing means for providing for a robot to associate with said second inheritance data,
   wherein said second inheritance data is created by said inheritance data creation means; whereby said robot acquires at least one new behavior relating to said new second inheritance data.

2. The information processing device according to claim 1, comprising inheritance data obtaining means for obtaining said first inheritance data via a network.

3. The information processing device according to claim 1, wherein said providing means provides said second inheritance data via a network.

4. The information processing device according to claim 1, comprising storage means for storing plural pieces of said first inheritance data registered in advance, and wherein said inheritance data creation means creates said second inheritance data using said first inheritance data which is designated out of said plural pieces of first inheritance data stored in said storage means.

5. An information processing method, comprising the steps of:
   creating a new second inheritance data which regulates the shape and/or behaviors, of a virtual creature that exists as data and is designed to be programmed to perform actions by the virtual creature, based on first inheritance data which regulates the shape and/or behaviors, of said virtual creature; and
   providing said second inheritance data for a robot to associate with said second inheritance data, wherein said second inheritance data is created by an inheritance data creation means; whereby said robot acquires at least one new behavior relating to said new second inheritance data.

6. The information processing method according to claim 5, wherein said creating step is to: obtain said first inheritance data from the outside via a network; and create said second inheritance data based on said first inheritance data obtained.

7. The information processing method according to claim 5, wherein said second step is to provide said second inheritance data via a network.

8. The information processing method according to claim 5, wherein said first step is to: store said plural pieces of fist inheritance data registered in advance; and create said second inheritance data using said first inheritance data which is designated out of said plural pieces of first inheritance data stored.

9. A program for making a computer execute processing, comprising
   a first step of creating new second inheritance data which regulates the shape and/or behaviors, of a virtual creature that exists as data and is designed to be programmed to perform actions by the virtual creature, based on first inheritance data which regulates the shape and/or behaviors, of said virtual creature; and
   a second step providing for a robot to associate with said second inheritance data;
   whereby said robot acquires at least one new behavior relating to said new second inheritance data.

10. The program according to claim 9, wherein said first step is to: obtain said first inheritance data from the outside via a network; and create said second inheritance data based on said first inheritance data obtained.

11. The program according to claim 9, wherein said second step is to provide said second inheritance data via a network.

12. The program according to claim 9, wherein said first step is to: store said plural pieces of first inheritance data registered in advance; and create said second inheritance data using said first inheritance data which is designated out of said plural pieces of first inheritance data stored.

13. A data storing device, comprising:
   a first storage means for storing inheritance data which regulates the shape and/or behaviors of a first virtual creature that exists as data and is desianed to be programmed to perform actions by the first virtual creature;
   communication means coupled to the first storage means for transmitting and receiving said inheritance data to/from the outside; and
   a second storage means for storing said inheritance data of a second virtual creature which is obtained through said communication means.

14. An information processing device, comprising:
   a diagnostic means for diagnosing virtual gene data which regulates the shape and/or behaviors of a virtual creature that can be expressed as data and is designed to be programmed to perform actions by the virtual creature; and bestowing means for bestowing at least one given value being added to said virtual creature when said diagnostic means determines that said virtual gene data satisfies a set of predetermined conditions.

15. The information processing device according to claim 14, wherein said virtual creature is sequentially created by means of mixing; and said value added is a pedigree of said virtual creature.

16. The information processing device according to claim 15, wherein said value added is an emblem corresponding to said pedigree.

17. The information processing device according to claim 14, comprising obtaining means for obtaining said gene data via a network.

18. An information processing method, comprising: a first step of diagnosing gene data which regulates the shape and/or behaviors of a virtual creature that can be expressed as data and is designed to be programmed to perform actions by the virtual creature; and a second step of bestowing at least one given value being added to said virtual creature when said first step determines that said virtual gene data satisfies a set of predetermined conditions.

19. The information processing method according to claim 18, wherein: said virtual creature is sequentially created by means of mixing; and said value added is a pedigree of said virtual creature.

20. The information processing method according to claim 19, wherein said value added is an emblem corresponding to said pedigree.

21. The information processing method according to claim 18, wherein said first step is to obtain said gene data via a network.

22. A program for making a computer execute processing, comprising:

a first step of diagnosing gene data which regulates the shape and/or behaviors of a virtual creature that can be expressed as data and is designed to be programmed to perform actions by the virtual creature; and a second step of bestowing at least one given value being added to said virtual creature when said first step determines that said virtual gene data satisfies a set of predetermined conditions.

23. The program according to claim 22, wherein: said virtual creature is sequentially created by means of mixing; and said value added is a pedigree of said virtual creature.

24. The program according to claim 23, wherein said value added is an emblem corresponding to said pedigree.

25. The program according to claim 22, wherein said first step is to obtain said gene data via a network.

26. An information processing device, comprising:

a storage means for storing information on parents of each of virtual creatures, said virtual creatures being represented as data and have been sequentially created by means of mixing; and an inquiring means disposed to access the storage means for inquiring into a pedigree of a designated virtual creature, based on said information of said parents of each of said virtual creatures.

27. The information processing device according to claim 26, comprising certificate issuing means for issuing a certificate on said pedigree of said virtual creature designated, based on the inquiry result obtained by said inquiring means.

28. An information processing method, comprising: a first step of storing information on parents of each of a set of registered virtual creatures as data and have been sequentially created by means of mixing; and a second step of accessing the stored information to enquire into the pedigree of a designated virtual creature, based on said information on said parents of each of said virtual creatures.

29. The information processing device according to claim 28, comprising a third step of issuing a certificate on said pedigree of said virtual creature designated, based on the inquiry result obtained by said inquiring means.

30. A program for making a computer execute processing, comprising:

a first step of storing information on parents of each of a set registered virtual creatures as data and have been sequentially created by means of mixing; and a second step of accessing the stored information to enquire into the pedigree of a designated virtual creature, based on said information on said parents of each of said virtual creatures.

31. The program according to claim 30, comprising a third step of issuing a certificate on said pedigree of said virtual creature designated, based on the inquiry result obtained by said inquiring means.

* * * * *